United States Patent
Le Van Gong et al.

(10) Patent No.: US 11,803,844 B2
(45) Date of Patent: Oct. 31, 2023

(54) MULTI-PARTY COMPUTATION IN A COMPUTER SHARDING ENVIRONMENT

(71) Applicant: PAYPAL, INC., San Jose, CA (US)

(72) Inventors: Hubert Andre Le Van Gong, San Jose, CA (US); Jinesh Patel, Cedar Park, TX (US)

(73) Assignee: PayPal, Inc., San Jose, CA (US)

( * ) Notice: Subject to any disclaimer, the term of this patent is extended or adjusted under 35 U.S.C. 154(b) by 136 days.

(21) Appl. No.: 17/543,143

(22) Filed: Dec. 6, 2021

(65) Prior Publication Data

US 2023/0177496 A1    Jun. 8, 2023

(51) Int. Cl.
*G06Q 20/00* (2012.01)
*G06Q 20/38* (2012.01)
*H04L 9/08* (2006.01)
*H04L 9/00* (2022.01)

(52) U.S. Cl.
CPC ..... *G06Q 20/3825* (2013.01); *G06Q 20/3829* (2013.01); *G06Q 20/38215* (2013.01); *H04L 9/08* (2013.01); *H04L 9/50* (2022.05); *H04L 2209/56* (2013.01)

(58) Field of Classification Search
CPC ......... G06Q 20/3825; G06Q 20/38215; G06Q 20/3829; H04L 9/08; H04L 9/50; H04L 2209/56
USPC .......................... 705/16, 21, 59; 380/44, 262
See application file for complete search history.

(56) References Cited

U.S. PATENT DOCUMENTS

| | | |
|---|---|---|
| 2006/0080389 A1 | 4/2006 | Powers et al. |
| 2017/0085545 A1 | 3/2017 | Lohe et al. |
| 2020/0192770 A1 | 6/2020 | Walid et al. |
| 2021/0067319 A1 | 3/2021 | Chung et al. |
| 2021/0319510 A1* | 10/2021 | Lee ...................... H04L 9/3239 |

OTHER PUBLICATIONS

International Search Report and Written Opinion for Application No. PCT/US2022/048276 dated Mar. 15, 2023, 31 pages.

(Continued)

*Primary Examiner* — Dante Ravetti
(74) *Attorney, Agent, or Firm* — Haynes and Boone, LLP

(57) ABSTRACT

Methods and systems are presented for providing a framework for facilitating multi-party computation within a sharding environment. After a blockchain is divided into multiple shard chains, a multi-party computation system obtains attributes associated with a first shard chain. The attributes may represent characteristics of the first shard chain, characteristics of transactions recorded in the first shard chain, and characteristics of the computer nodes configured to manage the first shard chain. Based on the attributes, the multi-party computation system determines a multi-party computation scheme that specifies a minimum threshold number of nodes required to participate in a transaction validation process and at least one required node required to participate in the transaction validation process for the first shard chain. The multi-party computation system configures the computer nodes configured to manage the first shard chain to perform the transaction validation process according to the multi-party computation scheme.

20 Claims, 21 Drawing Sheets

(56) References Cited

OTHER PUBLICATIONS

Manshaei M.H., et al., "A Game-Theoretic Analysis of Shard-Based Permissionless Blockchains," In: preprint: arxiv.org, Sep. 24, 2018, retrieved from the Internet: URL: https://arxiv.org/pdf/1809.07307.pdf, on Feb. 11, 2023, 12 pages.

* cited by examiner

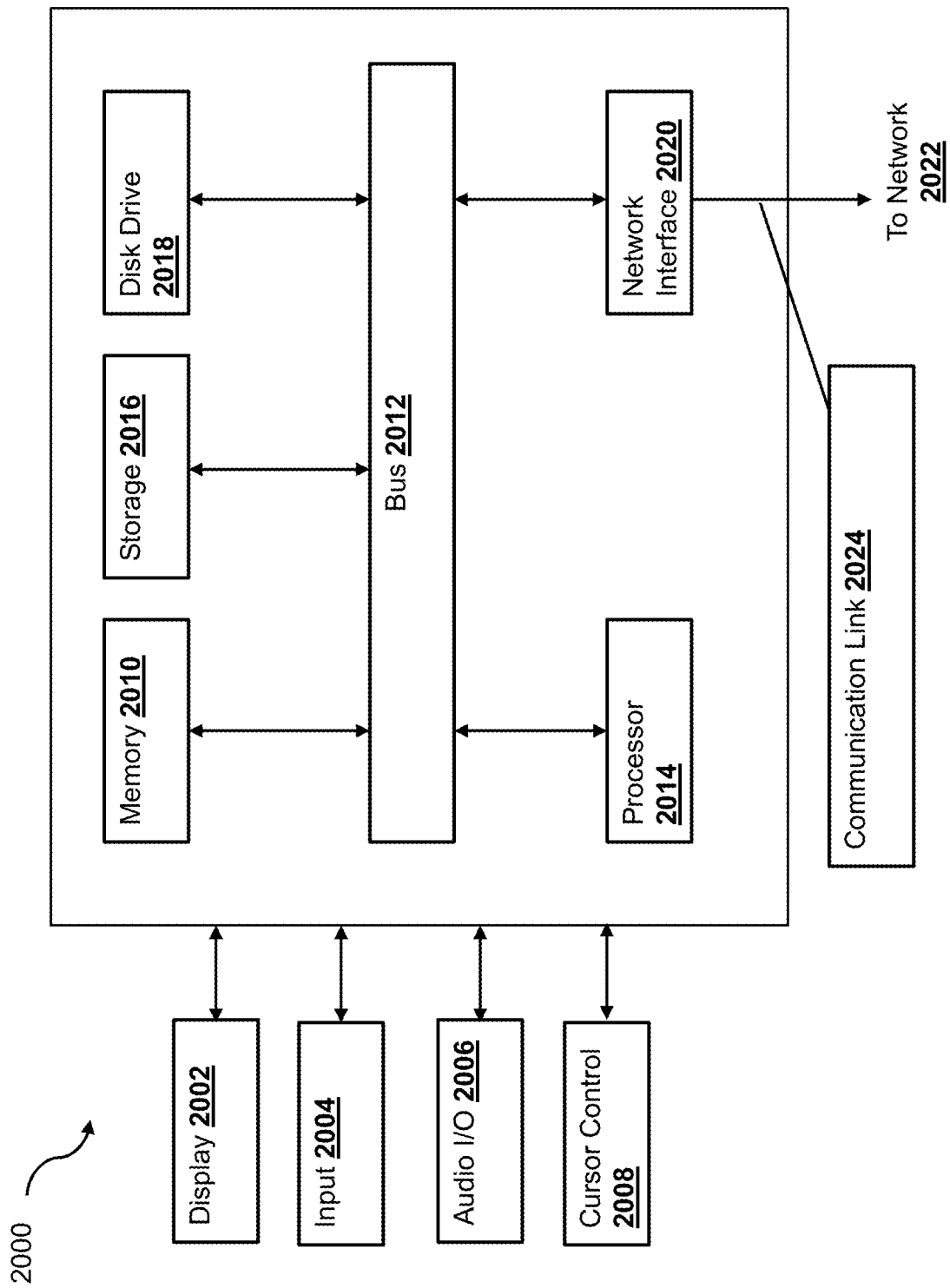

MULTI-PARTY COMPUTATION IN A COMPUTER SHARDING ENVIRONMENT

BACKGROUND

The present specification generally relates to distributed computing, and more specifically, to providing a framework for secured multi-party computation in a computer sharding environment according to various embodiments of the disclosure.

RELATED ART

Blockchains have become a popular computer data structure for storing transaction data due to its inherent peer-to-peer and immutable characteristics. For example, blockchains have been used as a decentralized ledger to record transaction data associated with various cryptocurrencies, smart contracts, and other types of transaction data. Copies and/or parts of a blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes.

As more transaction data is added to a blockchain, the speed and efficiency performance of managing the blockchain may suffer due to the size of the blockchain continuing to grow. One solution for increasing the scalability of blockchains is to divide a blockchain into multiple shard chains, where each shard chain corresponds to a distinct portion of the blockchain. The computer nodes that are configured to manage the blockchain may also be divided into different groups, where each group may be configured to manage a corresponding shard chain. While such a sharding solution can increase the scalability of a blockchain, it also makes the blockchain (or each of the shard chains associated with the blockchain) more vulnerable to attacks. For example, since the computer nodes that were configured to store and manage the blockchain are divided into multiple smaller groups of computer nodes for managing individual shard chains, a 51% attack on a shard chain can be accomplished by controlling (e.g., taking over, infecting with a virus, etc.) a substantially smaller number of computer nodes than accomplishing the same attack on the entire blockchain. Thus, there is a need for providing a framework that improves the security of electronic transactions within a sharding blockchain environment.

BRIEF DESCRIPTION OF THE FIGURES

FIG. 20 is a block diagram of a system for implementing a device according to an embodiment of the present disclosure.

Figure 1:
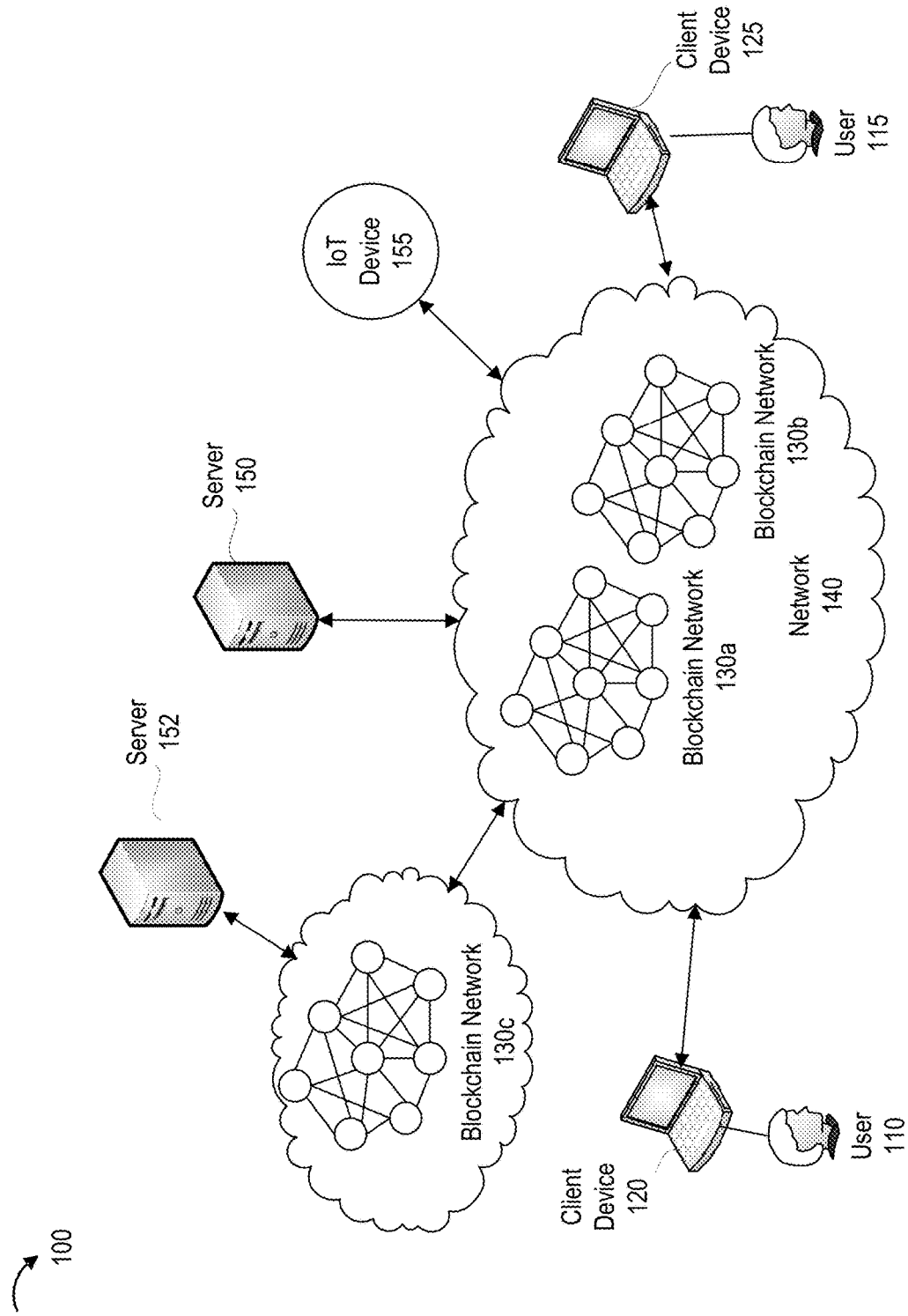
FIG. 1 illustrates an example computing architecture for facilitating one or more blockchain based transactions according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework for facilitating multi-party computation within a sharding environment. As discussed herein, as a blockchain that is managed by multiple computer nodes (in a blockchain network) grows in size, the speed and efficiency performance of adding transaction data to the blockchain may be reduced. One solution is to divide the blockchain into multiple portions (also known as "shard chains"), such that each of the computer nodes may be configured to store and manage only a corresponding shard chain (e.g., a corresponding portion of the blockchain) instead of the entire blockchain. The transactions that have been added to each shard chain may be merged to the blockchain subsequently (e.g., offline, etc.). Since the processing resources required to process transaction data for a shard chain of the blockchain are substantially less than that required to process transaction data for the entire blockchain, the speed and efficiency performance can be improved.

However, such a sharding solution also introduces new security risk to the blockchain. The integrity of a blockchain may be dependent on a number of factors, including the total number of computer nodes that are configured to store and manage copies of the blockchain within the blockchain network. That is because when the blockchain is being operated in a decentralized manner, a true version of the blockchain can be determined based on a consensus (e.g., a majority) from the computer nodes that are configured to store and manage the various copies of the blockchain. Thus, one way to compromise the integrity of the blockchain (e.g., adding fraudulent data to and/or removing legitimate data from the blockchain) is to take control of at least half of the computer nodes within the blockchain network that is configured to store and manage the blockchain (also known as the 51% attack as discussed above). The more computer nodes configured to store and manage copies of the blockchain, the more difficult it is to perform such an attack on the blockchain.

By dividing up the computer nodes that are configured to manage the blockchain into different groups of nodes (e.g., different shard networks) to store and manage a corresponding shard chain, the number of nodes configured to manage each shard chain is substantially less than the total number of nodes that were configured to manage the entire blockchain prior to the sharding. The substantially less number of nodes for storing and managing each shard chain may in turn lead to higher security risk for the blockchain, as it is easier to carry an attack (e.g., 51% attack) on any one of the shard chains than on the entire blockchain prior to the sharding.

As such, according to various embodiments of the disclosure, a multi-party computation system may be configured to use a multi-party computation technique to improve the security and integrity of various shard chains of a blockchain. In some embodiments, the multi-party computation system may access shard chains associated with a blockchain and the computer nodes configured to store and manage the shards. The multi-party computation system may determine one or more metrics for each of the shard chains. For example, the multi-party computation system may determine, for each shard chain, a chain metric that represents characteristics of the portion of the blockchain corresponding to the shard chain. The chain metric may indicate a size of the shard chain, an age (e.g., an average age, etc.) of the blocks in the shard chain, a rate or frequency of blocks being added to the shard chain, and other information associated with the shard chain. In some embodiments, the chain metric may also represent a size of the entire blockchain, an age of the blockchain, a rate or frequency of blocks being added to the blockchain as a whole, and other information associated with the blockchain.

The multi-party computer system may also determine a transaction metric representing characteristics of the transactions that are recorded in each shard chain. For example, the transaction metric may represent the amounts of the transactions (e.g., an average, a minimum, a maximum, etc.) being recorded in the shard chain, a number of transactions being recorded in the shard chain, a rate or frequency of transactions being recorded in the shard chain, a volatility of transactions being recorded in the shard chain, characteristics of the users and/or user devices used to conduct the transactions being recorded in the shard chain, and other information associated with the transactions being recorded in the shard chain. The multi-party computation system may also determine a node metric representing characteristics of the computer nodes within the group configured to store and manage the shard chain. For example, the node metric may represent a security level of each computer node within the group, hardware and/or software configuration of each computer node within the group, a network attribute associated with the connections among the computer nodes within the group, and other attributes associated with the computer nodes in the group.

Based on the metrics associated with the shard chains, the multi-party computation system may determine a multi-party computation scheme for each shard chain. The multi-party computation scheme may specify a minimum number (t) of participating nodes, out of all of the computer nodes (n number of computer nodes) in the group (in the shard network) corresponding to the shard chain, for validating a transaction to be recorded in the shard chain. By specifying a minimum number of participating nodes (e.g., more than half of the nodes in the group of nodes) for validating transactions to be recorded in a shard chain, the security of the shard can be improved.

In some embodiments, to further improve the security of the shards, the multi-party computation system may also identify a required (also referred to as "must-have") computer node for participating in validating transactions to be recorded in the shard chain. For example, the multi-party computation system may select, for each particular shard chain, a particular computer node as the required ("must-have") computer node for participating in validating transactions through the particular shard. For example, the multi-party computation system may select a particular computer node that is configured to store and manage the particular shard chain and also one or more other shard chains of the blockchain. The reason for selecting such a computer node as the required computer node is that computer nodes that are configured (e.g., by the administrator(s) of the blockchain) to store and manage multiple shard chains are usually more trust-worthy and have a higher level of security than other nodes. Thus, selecting the particular computer node as a required node for participating in the validation process would further increase the security of the shard.

To implement such a multi-party computation process, multiple secrets may be generated for a digital signature in a manner such that the combination of the multiple secrets are required to generate the digital signature. The number of secrets generated may correspond to one plus the number of required ("must-have") computer nodes for validating transactions conducted through the shard. For example, if only one required ("must-have") computer node is needed for the validation process, two secrets may be generated for generating the digital signature. If two required computer nodes are needed for the validation process, three secrets may be generated for generating the digital signature. The combination of all of the secrets is required to generate the digital signature. The multiple secrets may include one or more unshared secrets that correspond to the one or more required computer nodes, and a shared secret to be shared among the other nodes within the group configured to manage the shard.

The multi-party computation system may distribute the one or more unshared secrets among the one or more required computer nodes (in the event that there is only one required computer node, the one unshared secret is provided to the required computer node). The multi-party computation system may then generate shares from the remaining secret (the shared secret) using techniques disclosed herein, and distribute the shares associated with the shared secret to the other remaining computer nodes (the multiple computer nodes excluding the required nodes) within the group. In some embodiments, the multi-party computation system may generate the shares from the shared secret and distribute the shares to the remaining multiple computer nodes such that shares from any combination of a number of computer nodes equals to t minus the number of required nodes are needed to generate an output that mimics a computation based on the shared secret. In some embodiments, the output may be the shared secret. In some embodiments, the output may mimic a product generated based on the shared secret.

Accordingly, during a validation process for validating a transaction to be recorded in a shard of the blockchain, a set of computer nodes not including the required node(s) may collaborate in performing a set of computations using their corresponding shares to generate the shared secret or a product based on the shared secret. If a sufficient number of computer nodes (t minus the number of required nodes) participate in the validation process, the set of computer nodes would successfully generate an output that corresponds to the shared secret (e.g., the shared secret or an output the mimics a product generated by the shared secret) using their corresponding shares. The required node(s) may then perform additional computations on the output using the corresponding secret(s) to generate the digital signature. Only when the proper digital signature is generated would the transaction be recorded in the shard. Thus, when a number of computer nodes less than the minimum threshold number (t) of computer nodes participated in the validation or when any one of the required node(s) do not participate in the validation of a transaction, the transaction will not be recorded in the corresponding shard chain (e.g., discarded by the computer nodes in the shard network). In some embodiments, when the proper digital signature is generated, the generated digital signature may also be recorded in the shard chain (e.g., within the same block as transaction data associated with the transaction).

Blockchains

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and/or the second server 152 may be a computing device 1105 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain networks 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2 and is connected to one or more servers, such as the server 152, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. Each of the servers 150 and 152 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The first server 150 and/or the second server 152 may send the requested transaction to one of the blockchain networks 130 to be validated and approved as discussed below.

Blockchain Network

Figure 2:
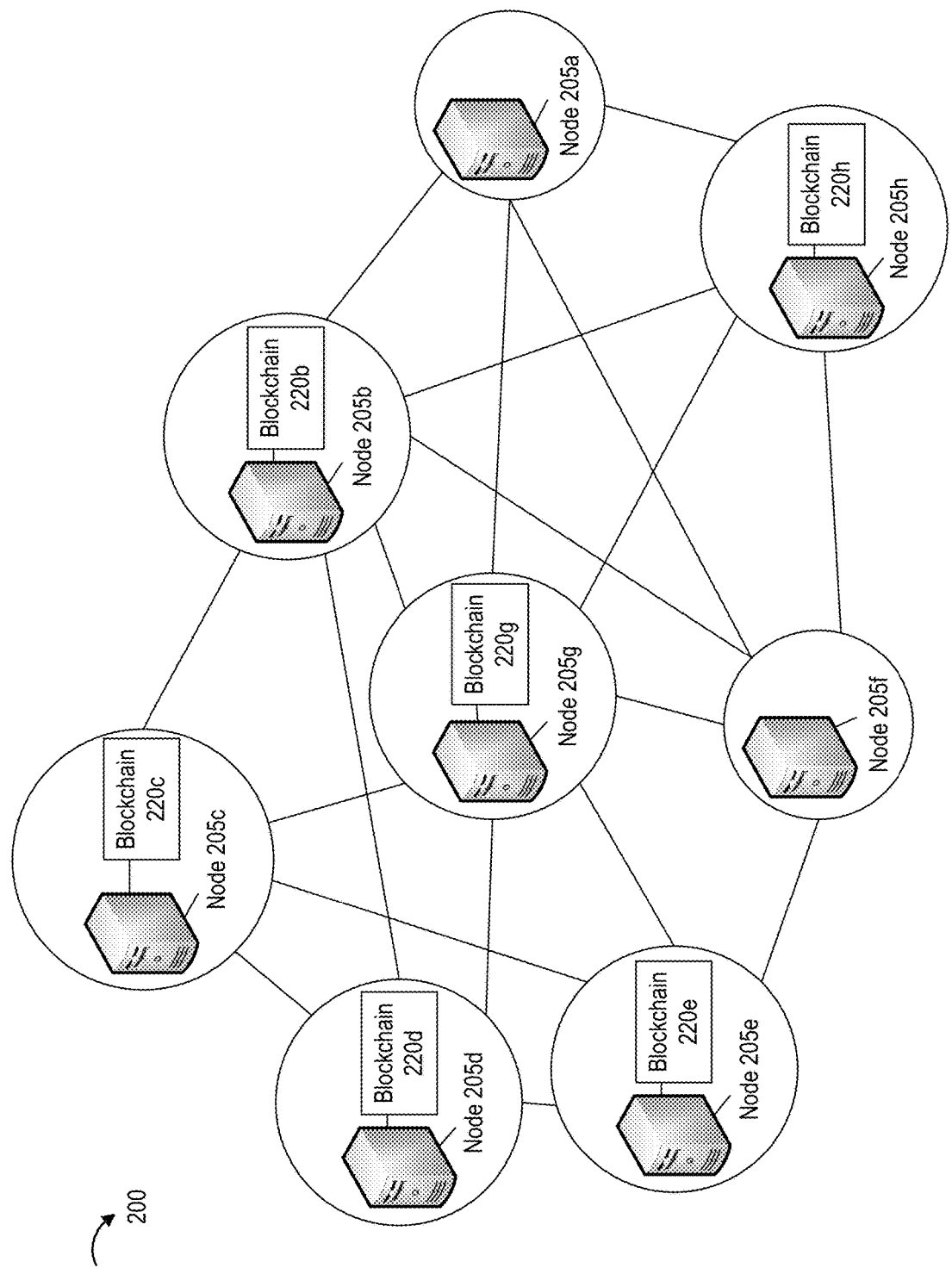
FIG. 2 illustrates an example blockchain network according to an embodiment of the present disclosure.
Figure 3:
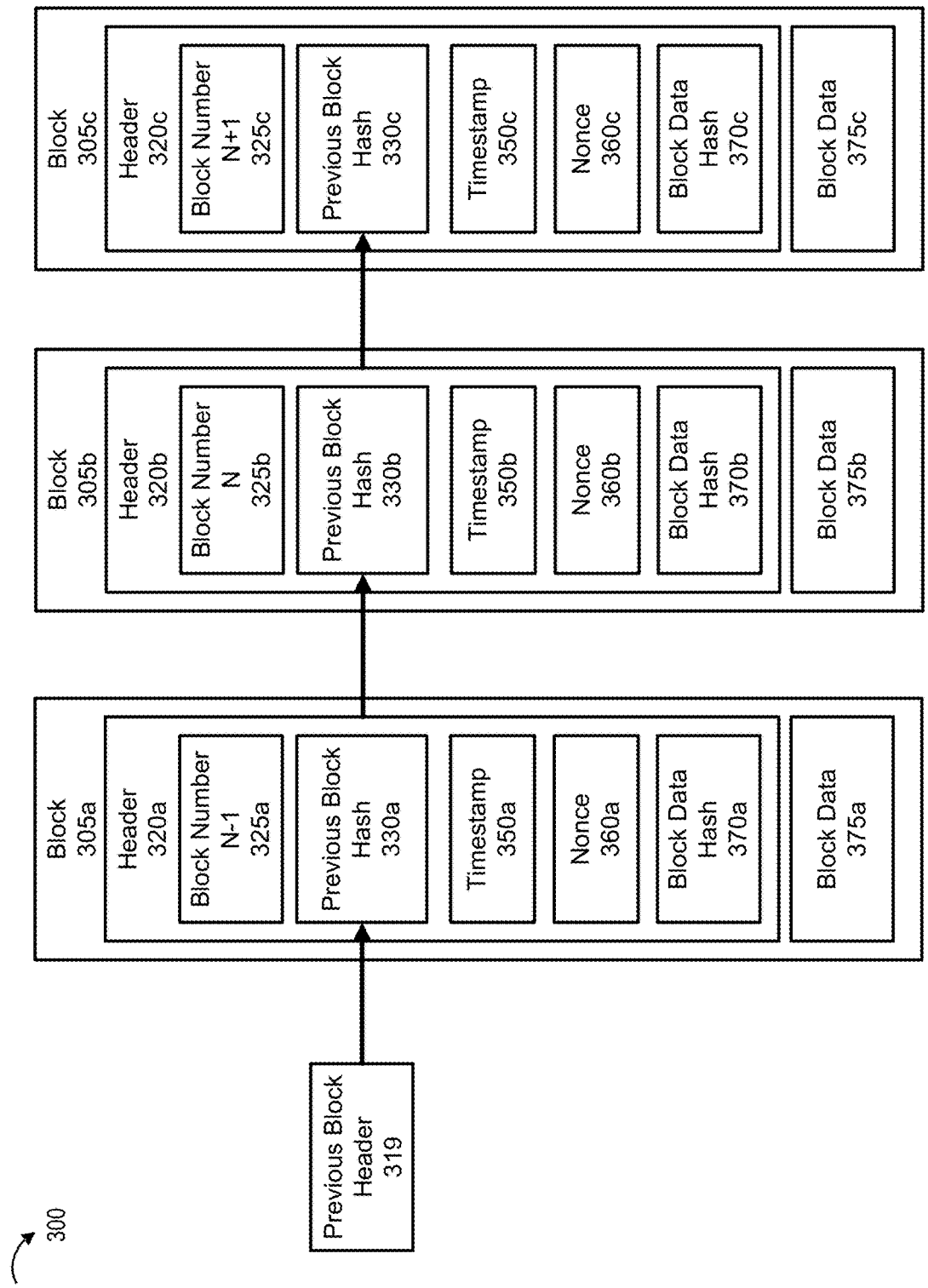
FIG. 3 illustrates an example blockchain according to an embodiment of the present disclosure.

FIG. 2 shows an example blockchain network 200 comprising a plurality of interconnected nodes or devices 205a-h (generally referred to as nodes 205). Each of the nodes 205 may comprise a computing device 1105 described in more detail with reference to FIG. 11. Although FIG. 2 shows a single device 205, each of the nodes 205 may comprise a plurality of devices (e.g., a pool). The blockchain network 200 may be associated with one or more blockchains 220a-h (generally referred to as blockchain 220). Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the first server 150 and/or the second server 152 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
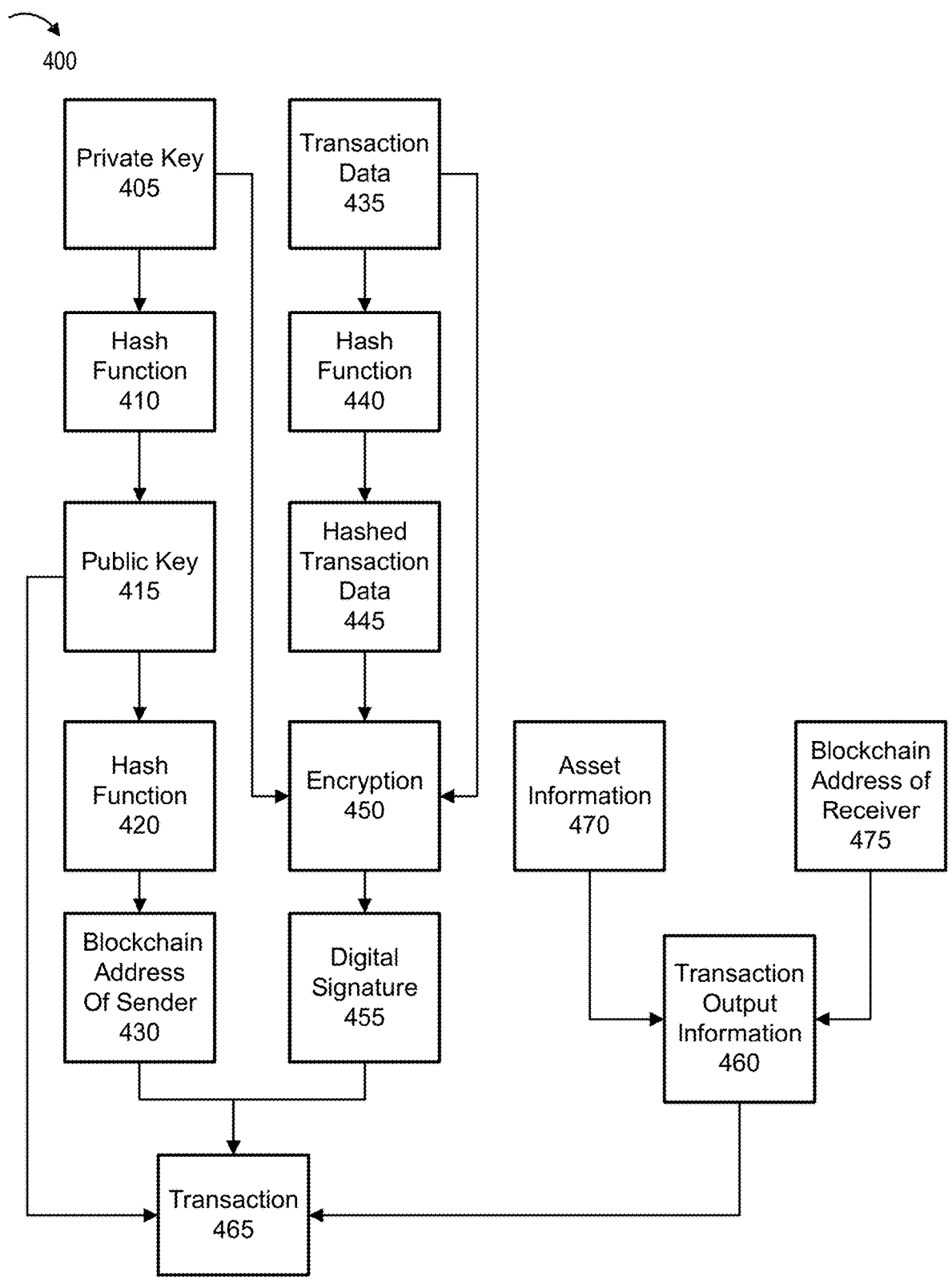
FIG. 4 is a diagram of an example transaction message according to an embodiment of the present disclosure.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on SHA-2 or SHA-3, although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 115, such as the blockchain address 475. The transaction 465 may be sent from the first client device 125 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
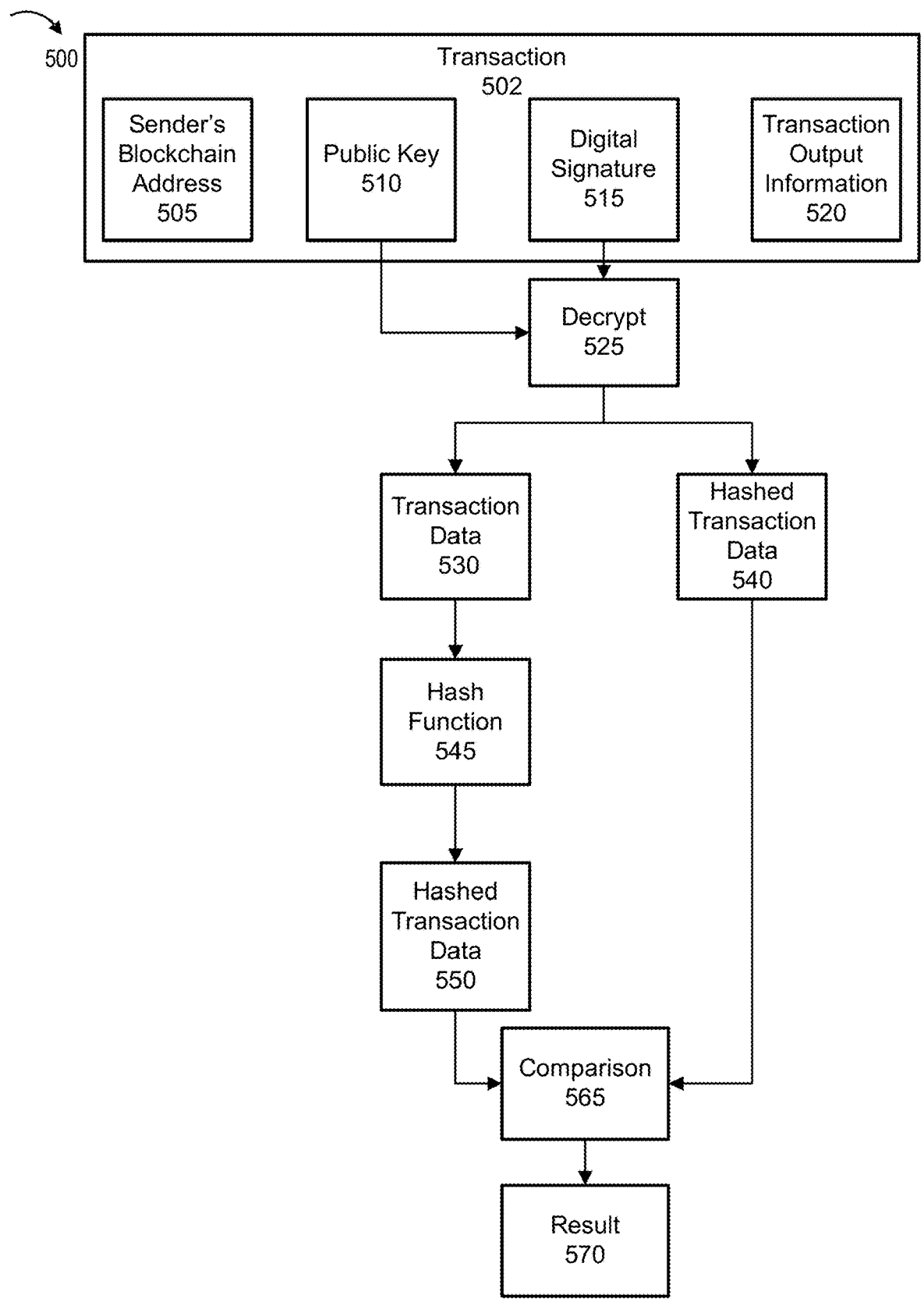
FIG. 5 shows an example transaction broadcast the blockchain network according to an embodiment of the present disclosure.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcasted to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain-Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
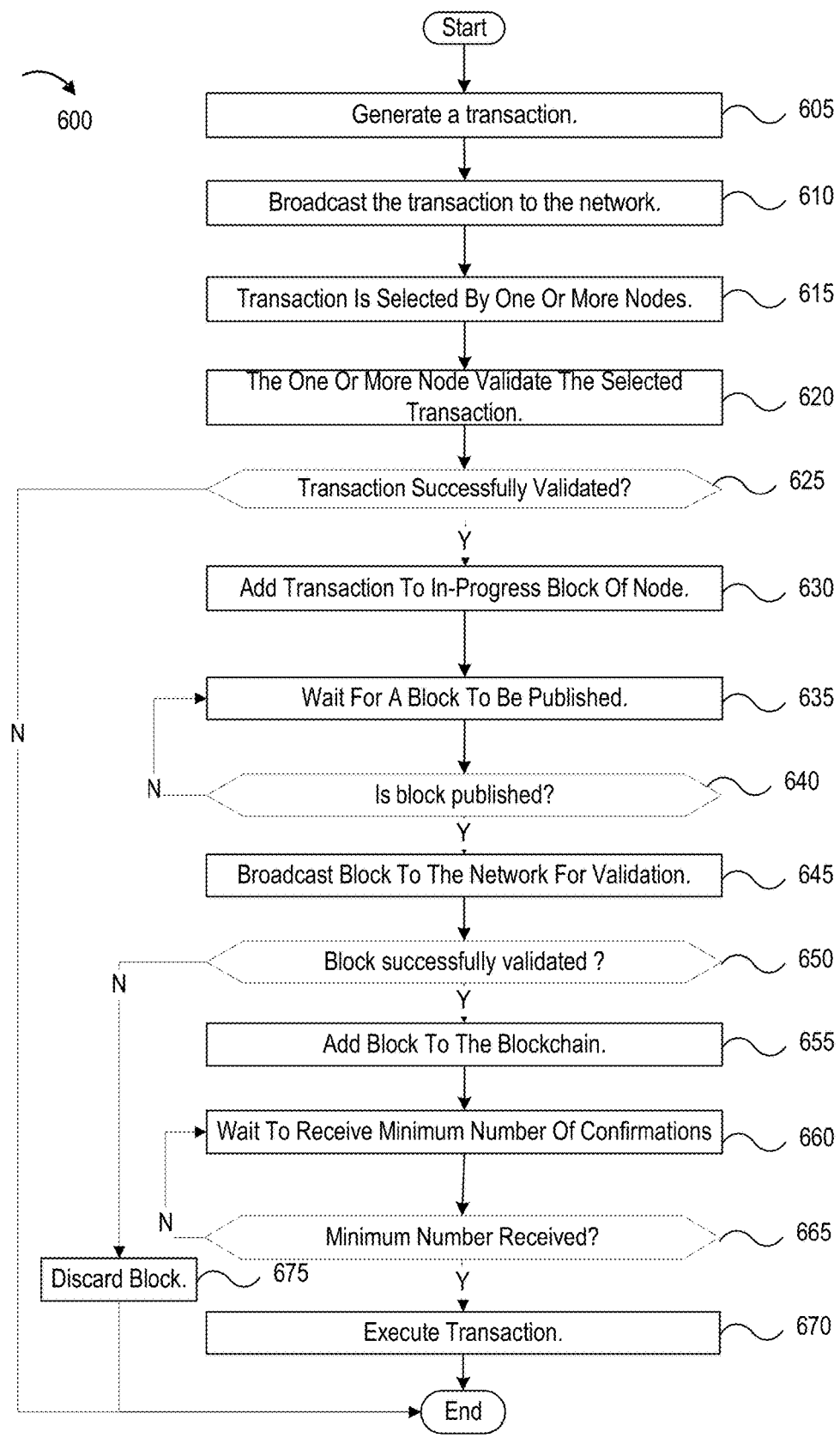
FIG. 6A is a flowchart showing an example process for performing a blockchain based transaction according to an embodiment of the present disclosure.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 120. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the first server 150 from the first client device 125.

The first server 150 may receive the transaction data from the first client device 125. At step 610, the first server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205 (step 630). As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
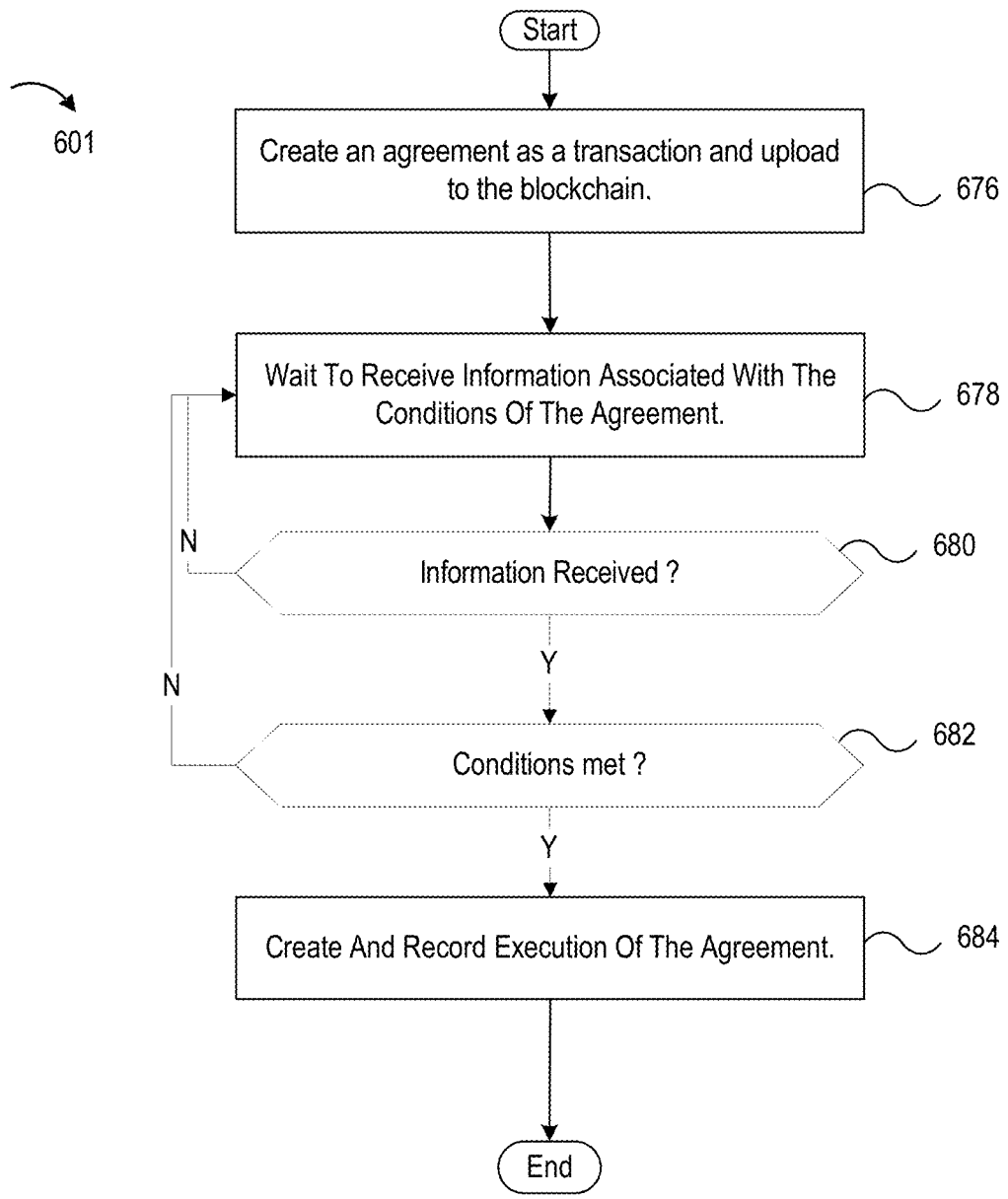
FIG. 6B is a flowchart showing another example process for performing a blockchain based transaction according to an embodiment of the present disclosure.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the $28^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 684, the process 601 creates and records a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the process 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IOT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned, and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, first user 110 (an insurance provider 110 in this example) may determine that the accident may have been caused by a defective component used in a wheel of the automobile. The insurance provider 110 may wish to trace a provenance of the component based on information recorded in the permissioned blockchain. The insurance provider 110 may query the blockchain data for information related to the component via, for example, a blockchain querying application executing on the first client device 120. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 8:
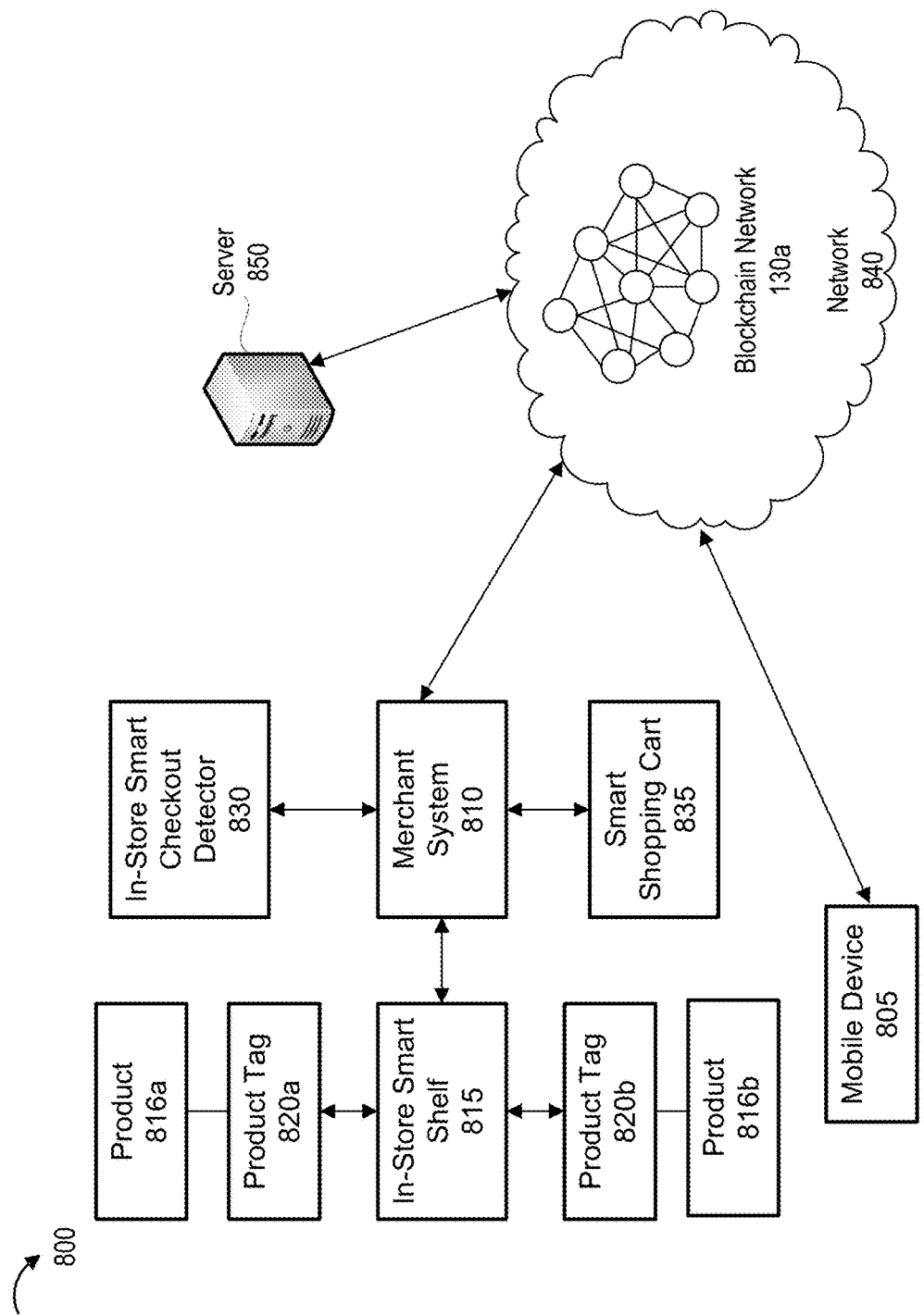
FIG. 8 illustrates an example of a blockchain enabled in-store purchase system according to an embodiment of the present disclosure.

An example of blockchain enabled in-store purchasing is described with reference to the system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820a attached to a first product 816a and a second product tag 820b attached to a second product 816b. The in-store smart shelf 815 may, based on reading the product tags 820a and 820b, send information about the products 816a and 816b throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816a. When the shopper is close to the in-store smart shelf 815, the mobile device 805 may notify the shopper that the first product 816a is currently available on the in-store smart shelf 815. The shopper may remove the first product 816a from the in-store smart shelf 815 and place it into a smart shopping cart 835. The smart shopping cart 835 may read the first product tag 820a as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816a, and payment information from the mobile device 805 to the merchant system 810. The merchant system 810 may receive information from the in-store smart checkout detector 830 and the payment information and proceed to initiate purchase of the first product 816a.

Referring to step 605 of the process 600 shown in FIG. 6A, a wallet application on the mobile device 805 may generate transaction data for transferring an amount of cryptocurrency matching the sale price of the first product 816a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 130a may wait for a block to be published. At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130a as a transaction. For example, at step 678, the process 601 may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. If the payment for the first product 816a was successfully transferred from the shopper to the merchant by the time the shopper removes the first product 816a from the smart shopping cart 835, then an electronic receipt may be generated and sent to the shopper. Otherwise, the merchant system 815 may be alerted that the shopper is attempting to leave the premises without paying for the first product 816a.

Blockchain Enabled In-Vehicle Purchasing

Figure 9:
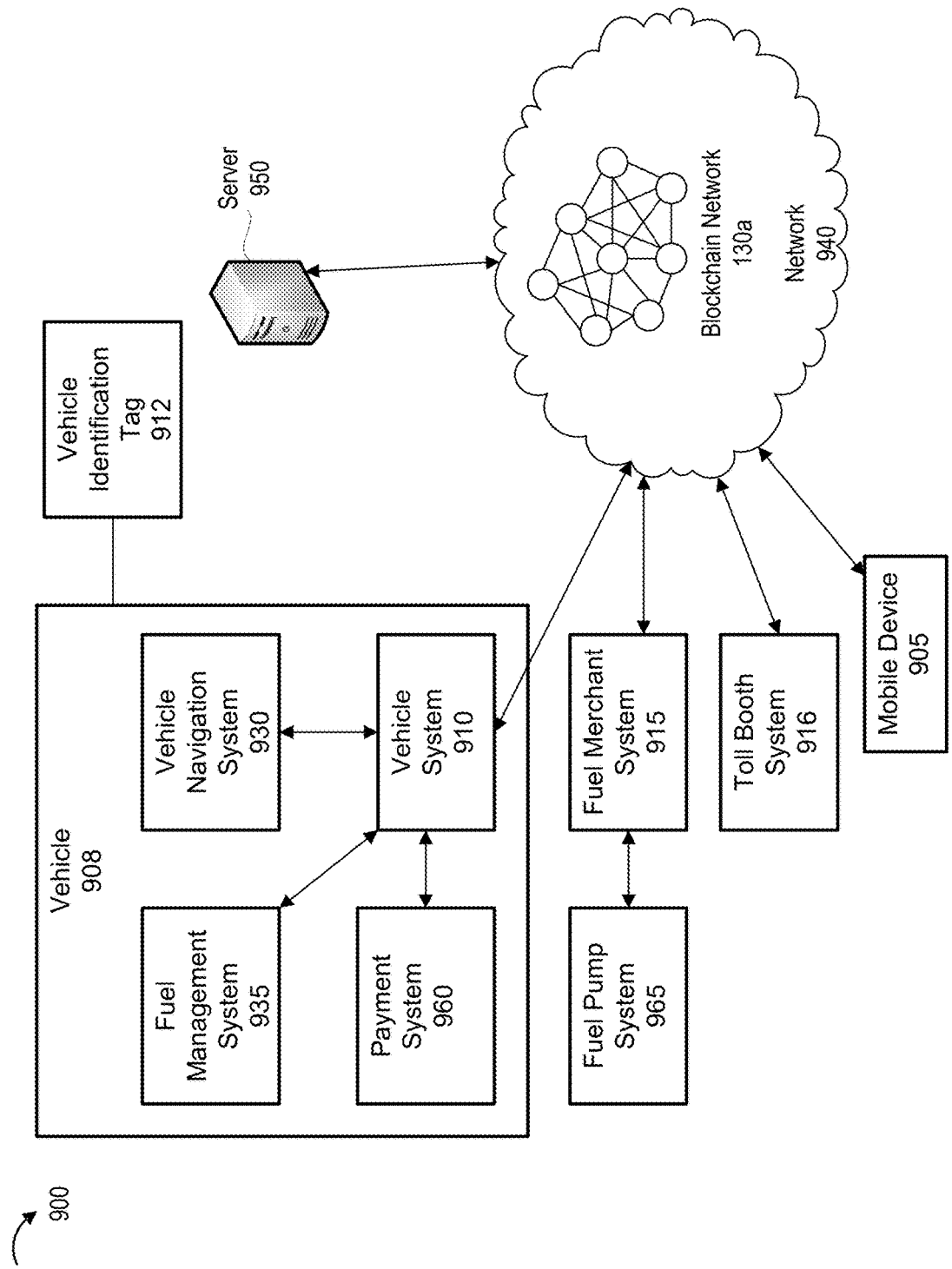
FIG. 9 illustrates an example of communications for an IoT blockchain enabled device system according to an embodiment of the present disclosure.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enable smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (Ar), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for some cryptographic algorithms or switching to quantum-proof algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the block because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 Mils (kilohash per second) which is 1,000 hashes per second, 1 MH/s (megahash per second) which is 1,000,000 hashes per second, 1 TH/s (terahash per second) which is 1,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
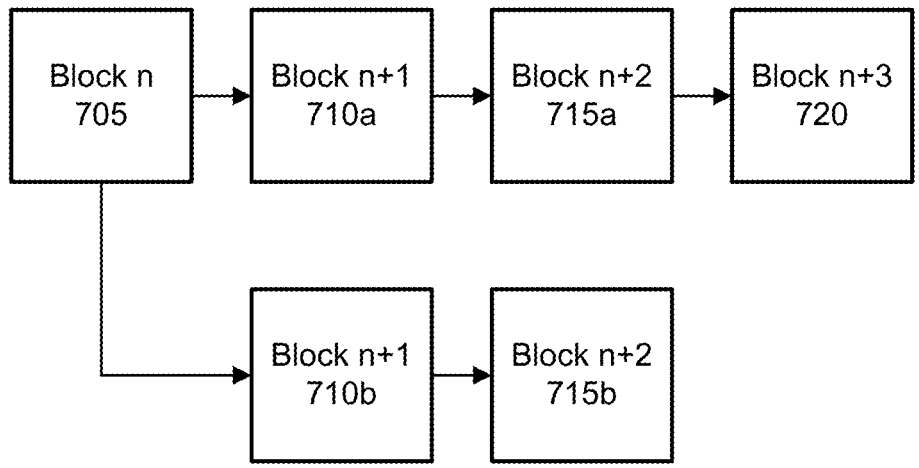
FIG. 7A shows an example of a privately broadcasted blockchain according to an embodiment of the present disclosure.
Figure 7B:
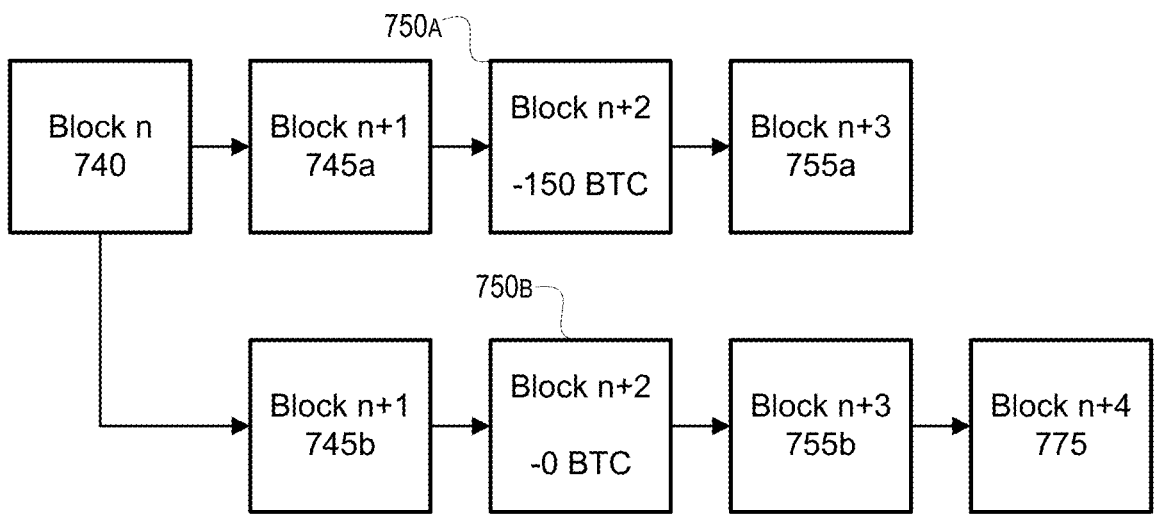
FIG. 7B shows an example of a blockchain misuse according to an embodiment of the present disclosure.

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain 700. The valid blockchain on the top comprises the valid blocks 705, 710*a*, 715*a*, and 720. The fraudulent blockchain on the bottom is not broadcast to the network and includes the blocks 705, 710*b*, 715*b*, and an invalid block 720, FIG. 7B shows another fraudulent and valid version of a blockchain. The valid version of the blockchain includes nodes 740, 745*a*, 750*a*, and 755*a*, The fraudulent version of the blockchain includes nodes 740, 745*b*, 750*b*, 755*b*, and 775. However, following the longest chain rule, the network may select and utilize the private or fraudulent blockchain comprising nodes 740, 745*b*, 750*b*, 755*b* and 775. Since it is the longest chain, previous transactions may be updated according to this chain. The cheating node may include transactions that spend money, such as the block 750*b* including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may, therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

Computing Device

Figure 10:
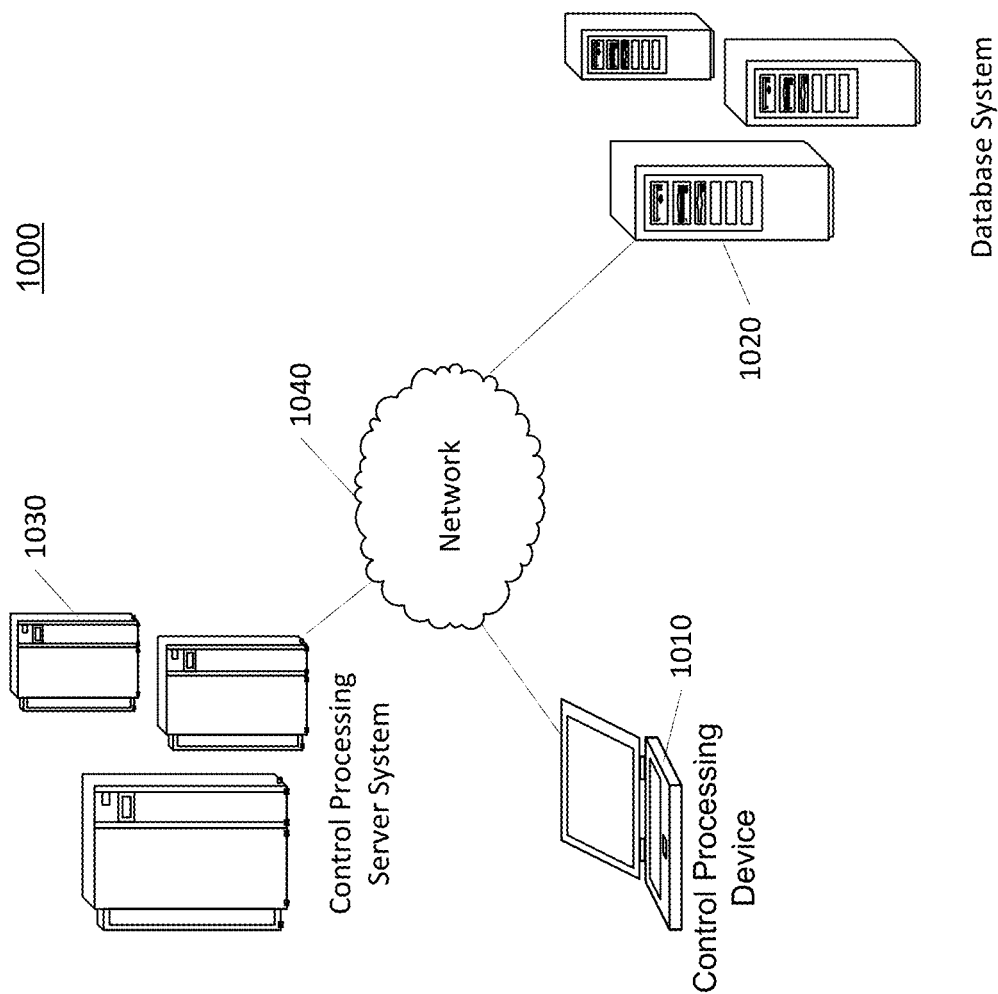
FIG. 10 illustrates an example system according to an embodiment of the present disclosure.

FIG. 10 shows a system 1000. The system 1000 may include at least one client device 1010 (also referred to as "control processing device"), at least one database system 1020, and/or at least one server system 1030 in communication via a network 1040. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 10.

Client device 1010 may access server applications and/or resources using one or more client applications (not shown) as described herein. Client device 1010 may be a mobile device, such as a laptop, smart phone, mobile phones, or tablet, or computing devices, such as a desktop computer or a server, wearables, embedded devices. Alternatively, client device 1010 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1020 may be configured to maintain, store, retrieve, and update information for server system 1030. Further, database system 1020 may provide server system 1030 with information periodically or upon request. In this regard, database system 1020 may be a distributed database capable of storing, maintaining, and updating large volumes of data across clusters of nodes. Database system 1020 may provide a variety of databases including, but not limited to, relational databases, hierarchical databases, distributed databases, in-memory databases, flat file databases, XML databases, NoSQL databases, graph databases, and/or a combination thereof.

Server system 1030 may be configured with a server application (not shown) that is capable of interfacing with client application and database system 1020 as described herein. In this regard, server system 1030 may be a stand-alone server, a corporate server, or a server located in a server farm or cloud-computer environment. According to some examples, server system 1030 may be a virtual server hosted on hardware capable of supporting a plurality of virtual servers.

Network 1040 may include any type of network. For example, network 1040 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1000 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1000. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1000 in front of one or more computing devices such that any external devices may communicate directly with the specialized hardware.

Figure 11:
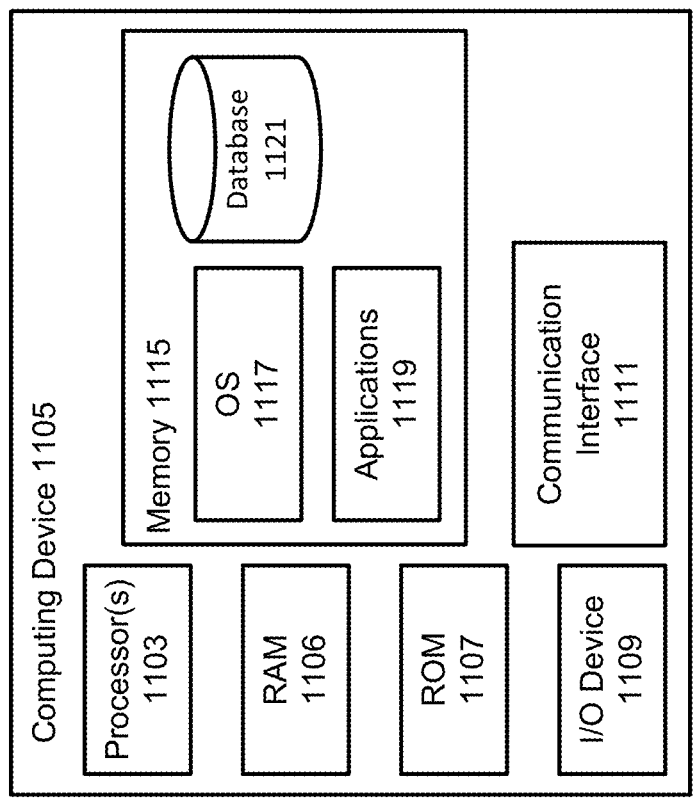
FIG. 11 illustrates an example computing device according to an embodiment of the present disclosure.

Turning now to FIG. 11, a computing device 1105 that may be used with one or more of the computational systems is described. The computing device 1105 may include a processor 1103 for controlling overall operation of the computing device 1105 and its associated components, including RAM 1105, ROM 1107, input/output device 11011, communication interface 1111, and/or memory 1115. A data bus may interconnect processor(s) 1103, RAM 1106, ROM 1107, memory 1115, I/O device 1109, and/or communication interface 1111. In some embodiments, computing device 1105 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1109 may include a microphone, keypad, touch screen, and/or stylus motion, gesture, through which a user of the computing device 1105 may provide input, and may also include one or more of a speaker for providing audio output and a video display device for providing textual, audiovisual, and/or graphical output. Software may be stored within memory 1115 to provide instructions to processor 1103 allowing computing device 1105 to perform various actions. For example, memory 1115 may store software used by the computing device 1105, such as an operating system 1117, application programs 1119, and/or an associated internal database 1121. The various hardware memory units in memory 1115 may include volatile and nonvolatile, removable and non-removable media implemented in any method or technology for storage of information such as computer-readable instructions, data structures, program modules, or other data. Memory 1115 may include one or more physical persistent memory devices and/or one or more non-persistent memory devices. Memory 1115 may include, but is not limited to, random access memory (RAM) 1106, read only memory (ROM) 1107, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1103.

Communication interface 1111 may include one or more transceivers, digital signal processors, and/or additional circuitry and software for communicating via any network, wired or wireless, using any protocol as described herein.

Processor 1103 may include a single central processing unit (CPU), which may be a single-core or multi-core processor, or may include multiple CPUs. Processor(s) 1103 and associated components may allow the computing device 1100 to execute a series of computer-readable instructions to perform some or all of the processes described herein. Although not shown in FIG. 11, various elements within memory 1115 or other components in computing device 1105, may include one or more caches, for example, CPU caches used by the processor 1103, page caches used by the operating system 1117, disk caches of a hard drive, and/or database caches used to cache content from database 1121. For embodiments including a CPU cache, the CPU cache may be used by one or more processors 1103 to reduce memory latency and access time. A processor 1103 may retrieve data from or write data to the CPU cache rather than reading/writing to memory 1115, which may improve the speed of these operations. In some examples, a database cache may be created in which certain data from a database 1121 is cached in a separate smaller database in a memory separate from the database, such as in RAM 1106 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1105 are described separately, functionality of the various components may be combined and/or performed by a single component and/or multiple computing devices in communication without departing from the invention.

DESCRIPTION OF THE INVENTION

Figure 12:
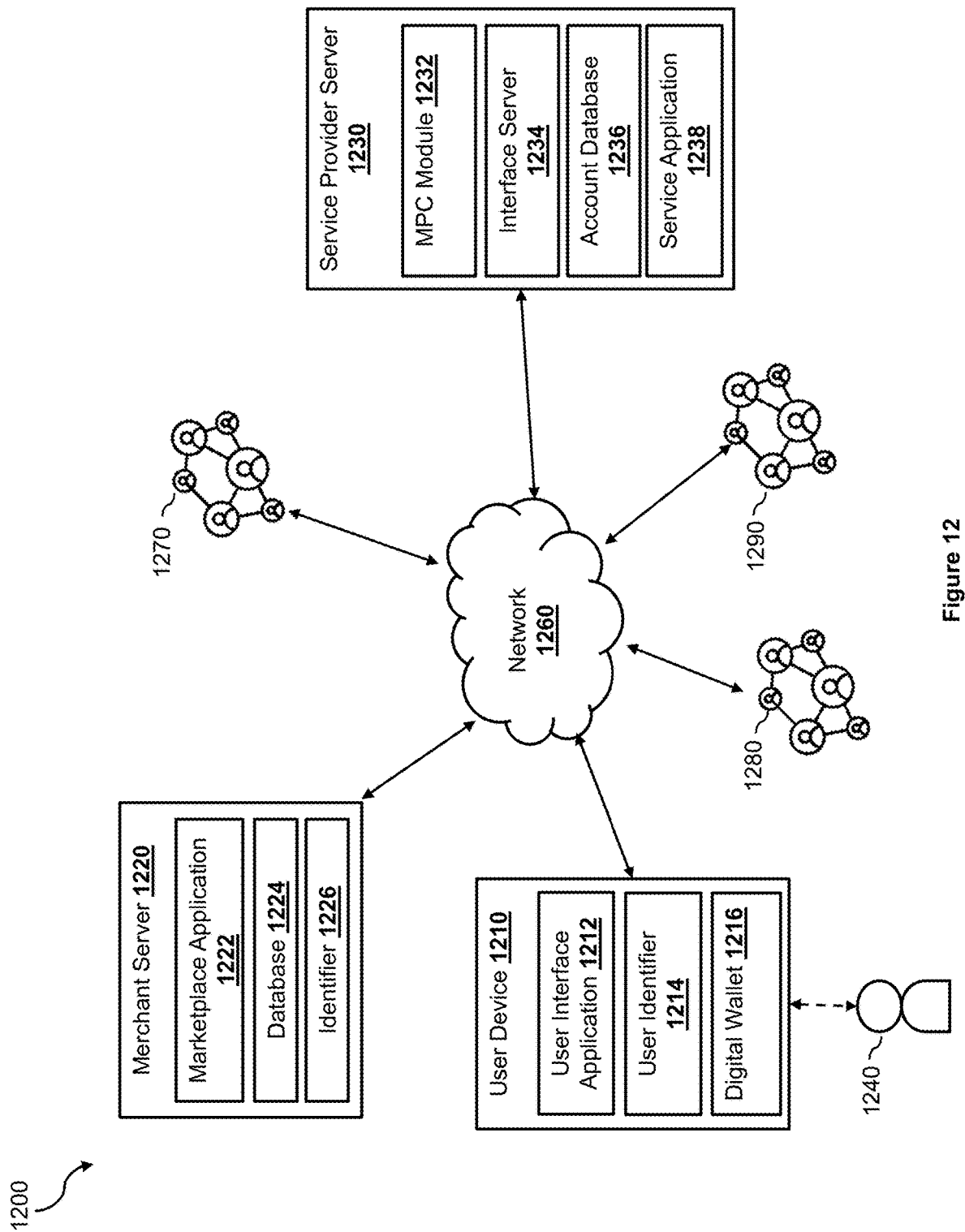
FIG. 12 is a block diagram illustrating a networked system that includes an electronic transaction system according to an embodiment of the present disclosure.

FIG. 12 illustrates a networked system 1200, within which the multi-party computation system may be implemented according to one embodiment of the disclosure. Note that the present techniques may be applied in many different computing and technological environments, however, and are not limited to those shown in the figures. The networked system 1200 includes a service provider server 1230, a merchant server 1220, a user device 1210, and networks of computer nodes 1270, 1280, and 1290 that may be communicatively coupled with each other via a network 1260. The network 1260, in one embodiment, may be implemented as a single network or a combination of multiple networks. For example, in various embodiments, the network 1260 may include the Internet and/or one or more intranets, landline networks, wireless networks, and/or other appropriate types of communication networks. In another example, the network 1260 may comprise a wireless telecommunications network (e.g., cellular phone network) adapted to communicate with other communication networks, such as the Internet.

The user device 1210, in one embodiment, may be utilized by a user 1240 to interact with the merchant server 1220 and/or the service provider server 1230 over the network 1260. The user 1240 may be a natural person or an entity (e.g., a corporation, a partnership, an organization, etc.). For example, the user 1240 may use the user device 110 to conduct an online transaction with the merchant server 1220 via websites hosted by, or mobile applications associated with, the merchant server 1220. The user 1240 may also log in to a user account to access account services or conduct electronic transactions (e.g., account transfers or payments, cryptocurrency transactions, etc.) with the service provider server 1230. The user device 1210, in various embodiments, may be implemented using any appropriate combination of hardware and/or software configured for wired and/or wireless communication over the network 1260. In various implementations, the user device 1210 may include at least one of a wireless cellular phone, wearable computing device, PC, laptop, etc.

The user device 1210, in one embodiment, includes a user interface (UI) application 1212 (e.g., a web browser, a mobile payment application, etc.), which may be utilized by the user 1240 to interact with the merchant server 1220 and/or the service provider server 1230 over the network 1260. In one implementation, the user interface application 1212 includes a software program (e.g., a mobile application) that provides a graphical user interface (GUI) for the user 1240 to interface and communicate with the service provider server 1230, and/or the merchant server 1220 via the network 1260. In another implementation, the user interface application 1212 includes a browser module that provides a network interface to browse information available over the network 1260. For example, the user interface application 1212 may be implemented, in part, as a web browser to view information available over the network 1260.

The user device 1210 may include a digital wallet application 1216 for facilitating payment transactions with the merchant server 1220 and/or the service provider server 1230. In some embodiments, the digital wallet application 1216 may include data associated with one or more funding sources (e.g., a credit card, a debit card, a bank account, etc.), which can be used for payment in one or more payment transactions conducted with the merchant server 1220 and/or the service provider server 1230. In some embodiments, the digital wallet application 1216 may include data associated with a cryptocurrency account (e.g., a private key associated with the cryptocurrency account, etc.), which may be used to perform cryptocurrency transaction with the merchant server 1220, the service provider server 1230, or any other cryptocurrency digital wallets.

The user device 1210, in one embodiment, may include at least one identifier 1214, which may be implemented, for example, as operating system registry entries, cookies associated with the user interface application 1212 and/or the authentication application 1216, identifiers associated with hardware of the user device 1210 (e.g., a media control access (MAC) address), or various other appropriate identifiers. In various implementations, the identifier 1214 may be passed with a user login request to the service provider server 1230 via the network 1260, and the identifier 1214 may be used by the service provider server 1230 to associate the user 1240 with a particular user account (e.g., and a particular profile) maintained by the service provider server 1230.

In various implementations, the user 1240 is able to input data and information into an input component (e.g., a keyboard) of the user device 1210. For example, the user 1240 may use the input component to interact with the UI application 1212 (e.g., to retrieve content from third-party servers such as the merchant server 1220, to provide inputs related to a goal to the service provider server 1230, etc.).

While only one user device 1210 is shown in FIG. 12, it has been contemplated that multiple user devices, each associated with a different user account with the service provider server 1230, may be connected to the user device 1210, the merchant server 1220, and the service provider server 1230 via the network 1260.

The merchant server 1220, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 1220 may include a merchant database 1224 for identifying available items, which may be made available to the user device 1210 for viewing and purchase by the user.

The merchant server 1220, in one embodiment, may include a marketplace application or server 1222, which may be configured to provide information (e.g., displayable content) over the network 1260 to the user interface application 1212 of the user device 1210. In one embodiment, the marketplace application 1222 may include a web server that hosts a merchant website for the merchant. For example, the user 1240 of the user device 1210 may interact with the marketplace application 1222 through the user interface application 1212 over the network 1260 to search and view various items available for access and/or purchase in the merchant database 1224. The merchant server 1220, in one embodiment, may include at least one merchant identifier 1226, which may be included as part of the one or more items made available for purchase so that, e.g., particular items are associated with the particular merchants. In one implementation, the merchant identifier 1226 may include one or more attributes and/or parameters related to the merchant, such as business and banking information. The merchant identifier 1226 may include attributes related to the merchant server 1220, such as identification information (e.g., a serial number, a location address, GPS coordinates, a network identification number, etc.).

While only one merchant server 1220 is shown in FIG. 12, it has been contemplated that multiple merchant servers, each associated with a different merchant, may be connected to the user device 1210 and the service provider server 1230 via the network 1260.

Each of the networks of computer nodes 1270, 1280, and 1290 (e.g., shard networks) may correspond to a shard chain of a blockchain. The blockchain may be associated with a particular transaction platform, such as a particular cryptocurrency, a particular platform for recording and managing smart contracts, etc. In the example where the blockchain is associated with a particular cryptocurrency (e.g., Bitcoin, Ethereum, etc.), the blockchain may record all of the transactions conducted using the particular cryptocurrency. When a new transaction using the particular cryptocurrency is initiated, upon validation of the new transactions by the computer nodes associated with the blockchain (e.g., using a proof-of-work or a proof-of-stake mechanism, etc.), the new transaction may be recorded within the blockchain. In another example, the blockchain may be associated with a particular transaction platform for conducting smart contracts. The blockchain may record all of the smart contracts conducted through the particular transaction platform. When a new smart contract is executed, upon validation of the smart contract by the computer nodes associated with the blockchain, the smart contract may be recorded in the blockchain. The records may include digital signatures representing the legitimacy of the corresponding block (and the corresponding transactions). Once the block is inserted into the blockchain, the block is no longer mutable. As such, the blockchain will continue to grow in size as more transactions are being recorded.

As discussed herein, as the blockchain grows in size, the speed and efficiency performance for recording additional transactions into the blockchain may suffer. One solution to improve the performance associated with the blockchain is to divide the blockchain into separate shard chains, where each shard chain corresponds to a distinct portion of the blockchain. In some embodiments, the computer nodes configured to store and manage the blockchain are divided into various groups (e.g., various shard networks) as well for separately storing and managing the shard chains of the blockchain. As such, each group of computer nodes (e.g., each shard network) may be responsible for storing and managing a corresponding shard chain. As each shard chain only includes a small portion of the entire blockchain, the processing resources required to operate the shard chain is substantially less than that required to operate the entire blockchain, resulting in substantial improvement in the overall speed and efficiency performance of operating the blockchain.

In one example, a blockchain may have been divided into three separate shard chains. However, in another example, the shard chains may be created separately and together form a new blockchain. In either case, each the shard chains may be managed by a different network of computer nodes (e.g., the shard network 1270, the shard network 1280, and the shard network 1290). As such, the computer nodes in each shard network may store copies of the corresponding shard chain and may be configured to manage the corresponding shard (e.g., generating blocks and appending the blocks into the corresponding shard, etc.). For example, the computer nodes within the shard network 1270 may store various copies of a first shard chain of the blockchain, and may be configured to record transactions to the first shard chain. The computer nodes within the shard network 1280 may store various copies of a second shard chain of the blockchain, and may be configured to record transactions to the second shard chain. The computer nodes within the shard network 1290 may store various copies of a third shard chain of the blockchain, and may be configured to record transactions to the third shard chain. In some embodiments, each group of computer nodes may be configured to use a validation mechanism (as discussed herein) to validate a transaction before adding the transaction to the corresponding shard chain. In some embodiments, transactions involving wallets handled in separate shards (i.e., inter-shard transactions) may be managed separately, via the collaboration of designated nodes in each shard.

The service provider server 1230, in one embodiment, may be maintained by a transaction processing entity or an online service provider, which may provide processing for electronic transactions between the users of the user device 1210 and one or more merchants or other types of payees. As such, the service provider server 1230 may include a service application 1238, which may be adapted to interact with the user device 1210, and/or the merchant server 1220 over the network 1260 to facilitate the searching, selection, purchase, payment of items, transaction authentication, and/or other services offered by the service provider server 1230. In one example, the service provider server 1230 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 1238 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds. In some embodiments, to process a fiat payment transaction, the service application 1238 may communicate (e.g., through a series of commands) with various servers associated with issuing banks and/or acquiring banks via a payment network. In some embodiments, to process a cryptocurrency payment transaction, the service application 1238 may communicate with various computer nodes (e.g., the computer nodes in the shard networks 1270, 1280, or 1290) associated with a blockchain.

The service provider server 1230 may also include an interface server 1234 that is configured to serve content (e.g., web content) to users and interact with users. For example, the interface server 1234 may include a web server configured to serve web content in response to HTTP requests. In another example, the interface server 1234 may include an application server configured to interact with a corresponding application (e.g., a service provider mobile application) installed on the user device 1210 via one or more protocols (e.g., REST API, SOAP, etc.). As such, the interface server 1234 may include pre-generated electronic content ready to be served to users. For example, the interface server 1234 may store a log-in page and is configured to serve the log-in page to users for logging into user accounts of the users to access various services provided by the service provider server 1230. The interface server 1234 may also include other electronic pages associated with the different services (e.g., electronic transaction services, etc.) offered by the service provider server 1230. As a result, a user (e.g., the user 1240), or a merchant associated with the merchant server 1220, etc.) may access a user account associated with the user and access various services offered by the service provider server 1230 (e.g., conduct various transactions such as payment transactions, data access transactions through a user account of the user), by generating HTTP requests directed at the service provider server 1230.

The service provider server 1230, in one embodiment, may be configured to maintain one or more user accounts and merchant accounts (e.g., digital wallet accounts, etc.) in an account database 1236, each of which may be associated with a profile and may include account information associated with one or more individual users (e.g., the user 1240 associated with user device 1210, etc.) and merchants (e.g., funding sources linked to the digital wallet application 1216, a key associated with a cryptocurrency wallet account, etc.). In one implementation, a user may have credentials to authenticate or verify identity with the service provider server 1230. Thus, the service provider server may store the credentials of the users in corresponding records of the account database 1236 associated with the user accounts.

In various embodiments, the service provider server 1230 includes a multi-party computation (MPC) module 1232 that implements at least a portion of the multi-party computation system as discussed herein. The MPC module 1232 may configure computer nodes in various shard networks to perform a validation process using the multi-party computation technique disclosed herein for validating electronic transactions conducted through one or more shard chains. As such, the MPC module 1232 may access each of the shard chains of the blockchain, and the shard networks 1270, 1280, and 1290. The MPC module 1232 may determine various metrics that characterizes the shard chains and/or the computer nodes within the shard networks. The various metrics may include a chain metric representing characteristics of the entire blockchain, a shard metric representing characteristics of the shard chain, transaction metric representing characteristics of transactions recorded in the shard chain, and node metric representing characteristics of the computer nodes within the shard network. Based on the various metrics, the MPC module 1232 may determine, for each shard chain, a multi-party computation scheme. The multi-party computation scheme may specify a threshold number of computer nodes needed to participate in a validation process in order to validate a transaction for the corresponding shard chain. In some embodiments, the multi-party computation scheme may also specify one or more required ("must-have") computer nodes for participating in the validation process in order to validate the transaction for the corresponding shard chain. The MPC module 1232 may also implement the multi-party computation schemes in the computer nodes of the corresponding shard networks, such that the computer nodes may use the multi-party computation scheme to validate transactions to be recorded in the corresponding shard chains.

Figure 13:
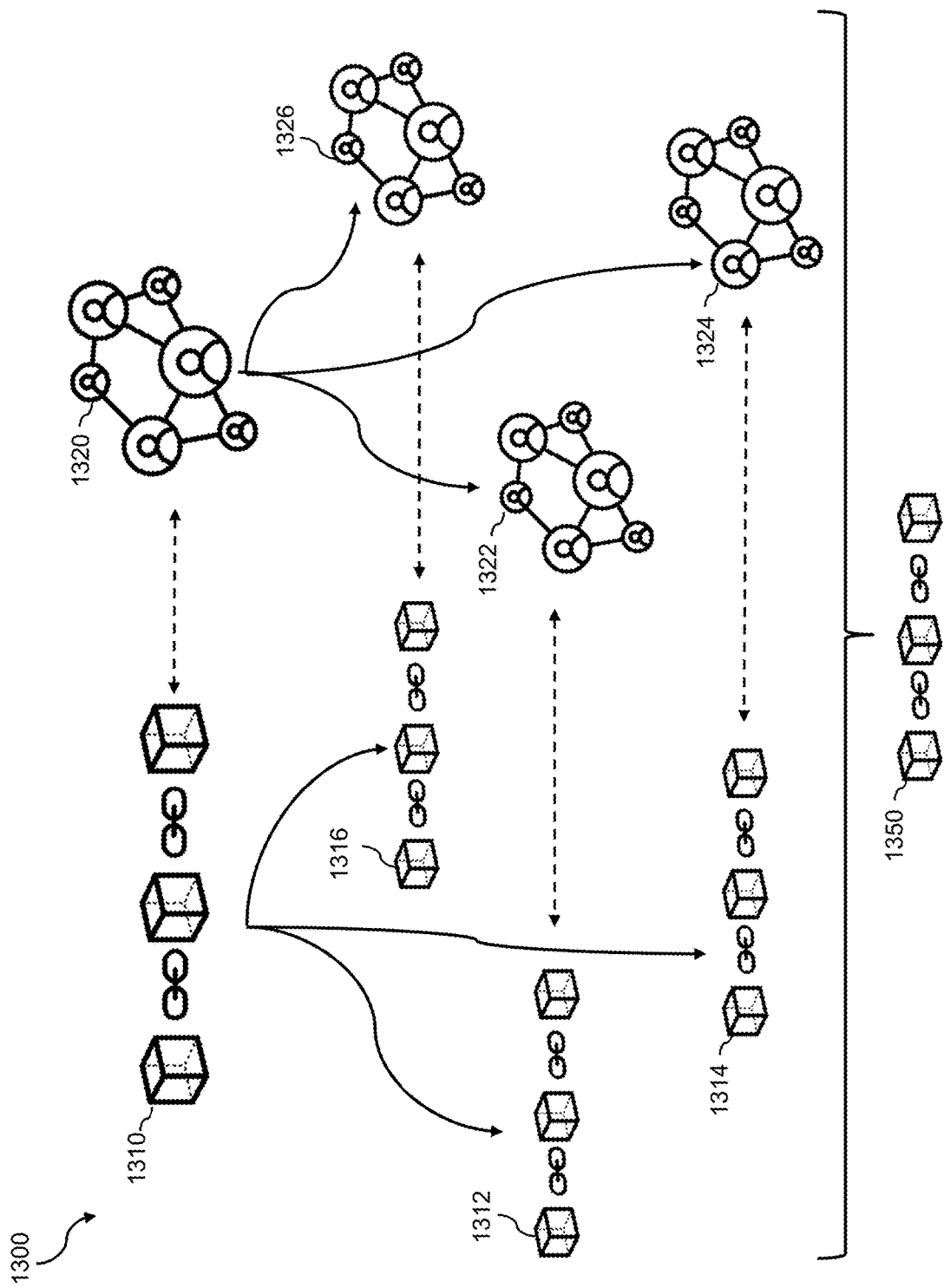
FIG. 13 illustrates an example sharding environment of a blockchain according to an embodiment of the present disclosure.

FIG. 13 illustrates a sharding environment 1300 associated with a blockchain 1310. In this example, the blockchain 1310 may be associated with a particular cryptocurrency or a particular transaction platform. The blockchain 1310 is managed by a network of computer nodes (a blockchain network) 1320. As such, each computer node in the blockchain network 1320 may store a copy of the blockchain 1310, and may be configured to manage the blockchain 1310 (e.g., perform validation of transactions and record transactions in the blockchain, etc.). As discussed herein, as the blockchain 1310 grows in size (e.g., transactions continue to be recorded to the blockchain 1310), the computation resources required by each computer node in the blockchain network of computer nodes 1320 to perform validation and recordation of the transactions also increase. As a result, the speed and efficiency performance of operating the blockchain 1310 may suffer.

In some embodiments, in order to improve the performance of operating the blockchain 1310, the blockchain may undergo a sharding process, in which the blockchain may be divided into multiple shard chains 1312, 1314, and 1316. Each of the shard chains 1312, 1314, and 1316 may corresponds to a distinct portion of the blockchain 1310, and the combination of the shard chains 1312, 1314, and 116 makes up the blockchain 1310. The division of the blockchain 1310 may be performed in different ways. For example, the blockchain 1310 may be divided based on user accounts (e.g., cryptocurrency wallet accounts) such that transactions associated with a first one or more user accounts are recorded in the shard chain 1312, transactions associated with a second one or more user accounts are recorded in the shard chain 1314, and transactions associated with third one or more user accounts are recorded in the shard chain 1316. In another example, the blockchain 1310 may be divided based on geographical regions where the transactions are conducted, such that transactions conducted in a first one or more regions are recorded in the shard chain 1312, transactions conducted in a second one or more regions are recorded in the shard chain 1314, and transactions conducted in third one or more regions are recorded in the shard chain 1316.

As discussed herein, in some embodiments, instead of dividing an existing blockchain into multiple shard chains, the shard chains 1312, 1314, and 1316 may be created separately, and together these shard chains 1312, 1314, and 1316 form a new blockchain. Thus, the sharding process may involve in the initial creation of the shard chains 1312, 1314, and 1316 for the new blockchain.

In some embodiments, the sharding process may also divide the blockchain network of computer nodes 1320 into multiple shard networks, where each shard network is responsible for storing and managing a corresponding shard chain. In this example, the blockchain network 1320 may be divided into a shard network 1322, a shard network 1324, and a shard network 1326. Alternatively, when the shard chains 1312, 1314, and 1316 are created separately, the shard networks 1322, 1324, and 1326 may be independently assigned to the respective shard chains. The shard network 1322 may be configured to store and manage the shard chain 1312, the shard network 1324 may be configured to store and manage the shard chain 1314, and the shard network 1326 may be configured to store and manage the shard chain 1316. While the shard chain 1310 and the blockchain network 1320 are divided into three shard chains and three shard networks, respectively, it is noted that the blockchain 1310 and the blockchain network 1320 can be divided in any number of shard chains and shard networks as desired (e.g., 5, 10, 100, etc.). Alternatively, any number of shard chains can be created to form a new blockchain. In some embodiments, in order to facilitate synchronization of the transactions added to the shard chains 1312, 1314, and 1316, a central chain (also referred to as a "beacon chain") 1350 may be generated. The central chain 1350 is configured to track all the changes occurred to the shard chains 1312, 1314, and 1316 such that a trusted version of the entire blockchain 1310 can be easily accessed via the central chain 1350. Furthermore, the central chain 1350 can be used during validation of new transaction to be added to any one of the shard chains 1312, 1314, and 1316. For example, while validating a new transaction for a shard chain, a computer node within a corresponding shard network may verify the new transaction based on prior transactions recorded in the central chain 1350 (e.g., to ensure that funds used in the new transaction was not spent in a previous transaction in another shard chain, etc.).

In one implementation, each block in the central chain 1350 may include crosslinks that link the block of the central chain 1350 to the corresponding blocks in the shard chains 1312, 1314, and 1316. Since there are three shard chains in this example, each block in the central chain 1350 may include three crosslinks, each crosslink linking the block of the central chain 1350 to a block of a corresponding shard chain. These crosslinks enable a synchronization between each of the shard chains 1312, 1314, and 1316 and the central chain 1350, and also communications among the shard chains 1312, 1314, and 1316 (e.g., for transactions that involve digital wallets associated with different shard chains, etc.). Further details on the operations of central chains and shard chains can be found in the article: The Beacon Chain Ethereum 2.0 (https://ethos.dev/beacon-chain/).

Since each shard network is configured to store and manage only a shard chain, which is a substantially smaller in size (in this example, each shard chain may be approximately one-third of the size of the blockchain 1310), the computer resources required to validate and record a new transaction in each of the shard chains 1312, 1314, and 1316 may be substantially less than what is required to validate and record a new transaction in the blockchain 1310. However, while the sharding environment 1300 improves the speed and efficiency performance of operating the blockchain 1310, it also introduces (or increases) the security risk to the shard chains 1312, 1314, and 1316. For example, in order to launch a 51% attack to the blockchain 1310 prior to the sharding, a malicious user would need to control (e.g., take over) over half of the computer nodes in the blockchain network 1320 prior to the sharding process. Thus, if the blockchain network 1320 includes 90 computer nodes, the malicious user may be required to control over 45 computer nodes. After the blockchain 1310 has been divided into the shard chains 1312, 1314, and 1316, since the blockchain network 1320 is also divided into three shard networks, where each shard network may include 30 computer nodes, the malicious user may only need to control over 15 computer nodes to compromise the integrity of each shard chain, which is substantially easier to do than controlling over 45 computer nodes. Thus, according to various embodiments of the disclosure, the MPC module 1232 may be configured to implement a multi-party computation process in each of the shard networks 1322, 1324, and 1316 for validating transactions to be recorded in each of the shard chains 1312, 1314, and 1316 to improve the security of the shard chains 1312, 1314, and 1316.

Figure 14:
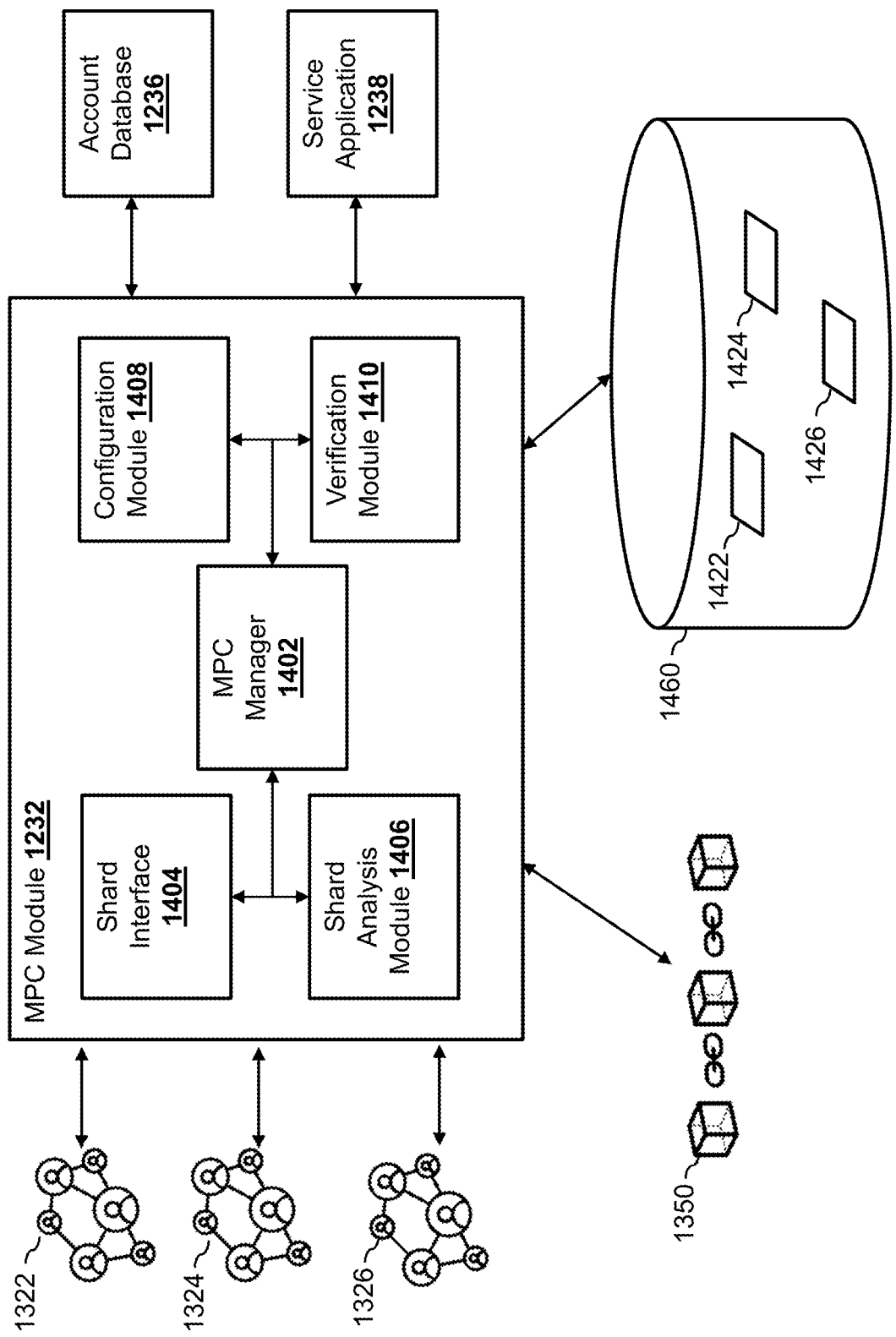
FIG. 14 is a block diagram illustrating a multi-party computation module according to an embodiment of the present disclosure.

FIG. 14 illustrates a block diagram of the MPC module 1232 according to an embodiment of the disclosure. The MPC module 1232 includes an MPC manager 1402, a shard interface 1404, a shard analysis module 1406, a configuration module 1408, and a verification module 1410. In some embodiments, the MPC module 1232 may be communicatively coupled to the central chain 1350 and the shard networks 1322, 1324, and 1326 that are configured to manage the shards 1312, 1314, and 1316, respectively. The MPC module 1232 may collaborate with the computer nodes in the shard networks 1322, 1324, and 1326 to configure and implement multi-party computation schemes for the shard chains 1312, 1314, and 1316, respectively. In some embodiments, the MPC module 1232 may be configured to facilitate the synchronization of the blockchain 1310 by managing the central chain 1350. For example, the MPC module 1232 may be configured to add any new transactions, that are validated to be added to any one of the shard chains 1312, 1314, and 1316, to the central chain 1350.

In some embodiments, the shard analysis module 1406 may, via the shard interface 1404, access each of the shard networks 1322, 1324, and 1326 to analyze the computer nodes and the copies of the shard chains stored in the computer nodes. For example, the shard analysis module 1406 may access the copies of the shard chains 1312, 1314, and 1316 stored in the shard networks 1322, 1324, and 1306. The shard analysis module 1406 may analyze the copies of the shard chains 1312, 1314, and 1316 to determine a chain metric. Since the combination of the shard chains 1312, 1314, and 1316 corresponds to the entire blockchain 1310, the shard analysis module 1406 may determine the chain metric that represents various characteristics of the blockchain 1310 based on analyzing the shard chains 1312, 1314, and 1316. The chain metric may represent various characteristics of blockchain 1310, such as a size of the blockchain 1310 (e.g., the number of transactions or blocks recorded in the blockchain 1310, the aggregated or average value of the transactions, a memory size of the blockchain 1310, etc.), an age of the blockchain 1310 (e.g., an average age of the transactions recorded in the blockchain 1310, etc.), a rate or frequency of blocks being added to the blockchain 1310 (e.g., to any one of the shard chains 1312, 1314, and 1316), and other information associated with the blockchain 1310.

The shard analysis module 1406 may also determine, for each individual shard chain (e.g., the shard chain 1312), a shard metric. The shard metric may represent various characteristics of the shard chain, such as a size of the shard chain (e.g., the number of transactions or blocks recorded in the shard chain 1312), an age (e.g., an average age, etc.) of the blocks in the shard chain, a rate or frequency of blocks being added to the shard chain, and other information associated with the shard chain.

The shard analysis module 1406 may also determine, for each shard chain (e.g., the shard chain 1312), a transaction metric representing characteristics of the transactions that are recorded in each shard chain. For example, the transaction metric may represent the amounts or values of the transactions (e.g., an average, a minimum, a maximum, etc.) being recorded in the shard chain 1312, a number of transactions being recorded in the shard chain 1312, a rate or frequency of transactions being recorded in the shard chain 1312, a volatility of transactions being recorded in the shard chain 1312, characteristics of the users and/or user devices used to conduct the transactions being recorded in the shard chain 1312, geographical regions in which transactions recorded in the shard chain 1312 are conducted, and other information associated with the transactions being recorded in the shard chain 1312.

The shard analysis module 1406 may also determine, for each shard chain (e.g., the shard chain 1312) a node metric representing characteristics of the computer nodes within the shard network (e.g., the shard network 1322) configured to store and manage the shard chain 1312. For example, the node metric may represent a security level of each computer node within the shard network 1322, hardware and/or software configuration of each computer node within the shard network 1322, a network attribute associated with the connections among the computer nodes within the shard network 1322, and other attributes associated with the computer nodes in the shard network 1322.

The shard analysis module 1406 may determine the various metrics for each of the shard chains 1312, 1314, and

1316. Based on the various metrics determined for the blockchain 1310 and the shard chains 1312, 1314, and 1316, the configuration module 1408 may determine a multi-party computation scheme for each of the shard chains 1312, 1314, and 1316. The multi-party computation scheme for a particular shard chain may specify a minimum number (t) of participating nodes, out of all of the computer nodes (n number of computer nodes) in the shard network corresponding to the particular shard chain, for validating a transaction to be recorded in the shard chain. By specifying a minimum number of participating nodes (e.g., more than half of the nodes in the shard network) for validating transactions to be recorded in a shard chain, the security of the shard chain can be improved.

In some embodiments, to further improve the security of the shards while reducing the number of required nodes, the configuration module 1408 may also determine the multi-party computation scheme to specify a required ("must-have") computer node for participating in validating transactions to be recorded in the shard chain. For example, the configuration module 1408 may select, for each particular shard chain, a particular computer node as the required ("must-have") computer node for participating in validating transactions through the particular shard chain. In some embodiments, the configuration module 1408 may select a particular computer node that is configured to store and manage the particular shard and also one or more other shard chains of the blockchain. For example, for the shard chain 1312, the configuration module may select a computer node that is part of the shard network 1322 and also at least one of the shard networks 1324 and 1326. The reason for selecting the computer node that is configured to manage multiple shard chains as the required computer node is that the computer node that is configured (e.g., by the administrator(s) of the blockchain) to store and manage multiple shard chains is usually hardened so as to be more trustworthy and with a higher level of security than other nodes. Furthermore, the particular computer node that is configured to manage multiple shard chains may have insights that other computer nodes may not have that would improve the security of the validation process of a transaction. For example, the particular computer node may determine that the transaction was conducted by a user account that has been linked to one or more fraudulent transactions associated with one or more other shard chains. That information, which other computer nodes associated with the shard chain does not have, may allow the particular computer node to determine not to validate the transaction to be recorded in the shard chain. Thus, selecting the particular computer node as a required node for participating in the validation process would further increase the security of the shard chain.

In some embodiments, the configuration module 1408 may adjust the minimum number (t) of participating nodes and the number of required computer nodes based on the various metrics. The ratio between the number of computer nodes required to perform the validation process (t) and the total number of computer nodes in the set of computer nodes (n) attributes to the security and resiliency of the validation process for the shard chain. For a given set of computer nodes (n), a larger t would increase the security, but would reduce the resiliency, of the validation process. Conversely, a smaller t would increase the resiliency, but would reduce the security, of the validation process. In some embodiments, the configuration module 1408 may determine the minimum number (t) to exceed half of the computer nodes in the group, such that more than half of the computer nodes in the shard network are required to collaborate on the validation of a transaction. As a result, a typical 51% attack would not succeed on a shard network that has been implemented with such a multi-party computation scheme.

In some embodiments, based on the various metrics, the configuration module 308 may further increase (or decrease) the minimum number (t) required to perform the validation process and/or increase (or decrease) the number of required nodes for performing the validation process. For example, the configuration module 1408 may increase the minimum number (t) in the multi-party computation scheme for a shard chain and/or increase the number of required computer nodes for validating a transaction when the various metrics indicate that transaction amounts are generally high (e.g., exceed a threshold), the computer nodes in the shard network do not have up-to-date versions of the software or do not have any security software installed on the computer nodes, lack of security in the connectivity among the nodes in the shard network, a frequency of transactions above a threshold, and/or other factors.

Once a multi-party computation scheme has been determined for a shard chain, the MPC manager 1402 may, via the shard interface 1404, implement the multi-party computation scheme among the computer nodes associated with the shard chain. For example, the MPC manager 1402 may generate (or otherwise obtain), for each of the shard chains 1312, 1314, and 1316, a pair of corresponding public key and private key. In some embodiments, the MPC manager 1402 may generate a pair of corresponding keys, such as a public key and private key, using an asymmetric cryptography algorithm for each of the shard chains 1312, 1314, and 1316. The pair of public key and private key corresponds with each other in a way that data encrypted using the private key can only be decrypted using the public key, and vice versa. The private key may be kept private by an administrator or a computer server associated with the blockchain 1310, and not shared with anyone. The authenticity of a digital signature produced by the validation process participated by one or more computer nodes within a group (e.g., data that is encrypted using a private key associated with the corresponding shard chain) can be verified by decrypting the digital signature using the corresponding public key to restore the data in its unencrypted form.

In this example, the MPC manager 1402 may generate a private key 1422 for the shard chain 1312, a private key 1424 for the shard chain 1314, and a private key 1426 for the shard chain 1316. The MPC manager 1402 may temporarily store the private keys 1422, 1424, and 1426 in a data storage 1460. A digital signature for each shard chain may be generated using the corresponding private key (e.g., by encrypting a piece of data using the corresponding private key). Thus, a digital signature for the shard chain 1312 may be generated using the private key 1422. Similarly, a digital signature for the shard chain 1314 may be generated using the private key 1424, and a digital signature for the shard chain 1316 may be generated using the private key 1426. However, using the multi-party computation scheme, instead of using the actual private keys, different sharable values may be used to generate an output that mimic the digital signatures of the shard chains, as will be explained in more detail below.

In some embodiments, the combined requirements of a quorum and required (must-have) nodes for the validation process may be implemented in an algorithmic level according to the multi-party computation scheme, such that any subset of the group of computer nodes associated with the shard chain may collaborate to produce a correct piece of data (e.g., data that mimic an encryption using a private key of the shard chain), as long as the subset includes the required computer node and includes at least the minimum threshold number (t) of computer nodes. In other words, an algorithm may be designed and implemented to require a set of computation to be performed among the subset of computer nodes such that anyone (e.g., any devices, and not limited to one centralized authoritative device) can determine whether the quorum and required nodes requirements are satisfied (a number of nodes that equal to or exceeds the minimum threshold number (t) of nodes, including the required node(s) have participated in the validation process) based on an output from the set of computation. This way, if a number of computer nodes that satisfies the quorum requirement, including the required node(s), participated in the validation process by performing the corresponding computations (e.g., the corresponding validation routines), a correct output may be generated. On the other hand, if the number of nodes that does not satisfy the quorum requirement, or does not include all of the required node(s), participated in the authentication process by performing the corresponding computations (e.g., the corresponding authentication routines), an incorrect output (or no output) may be generated. In some embodiments, a correct output may correspond to a digital signature associated with the shard chain (e.g., a piece of data encrypted using a private key of the shard chain). While the actual private key may not be used in the computation (e.g., the validation process), the output generated by the set of computations during the validation process may mimic a digital signature generated by encrypting a piece of data using the private key of the shard chain.

To implement the algorithm, a number of secrets may be generated based on the number of required node(s). For example, if only one required computer node is needed for the authentication process, two secrets may be generated for generating the digital signature. If two required computer nodes are needed for the authentication process, three secrets may be generated for generating the digital signature. One of the secrets (e.g., a shared secret) may be divided into multiple portions to generate shares associated with the secret. The shares may be distributed among the computer nodes used for the validation process, excluding the required node(s). The remaining secret(s) (the unshared secret(s)) may be distributed to the required node(s). Thus, each required node may be in possession of a respective unshared secret, while each remaining computer node may be in possession of a share associated with the shared secret. One share of the secret may include one or more values that can be used in collaboration with other shares to generate the shared secret.

In some embodiments, the secrets may be generated such that computations (e.g., a set of sequential computations) performed based on all of the generated secrets are required in order to produce a correct output (e.g., a digital signature for the shard chain). For example, if two secrets are generated (due to a one required node requirement), a sequential computation that includes a first computation based on a first of the two secrets and a second computation based on a second of the two secrets (where the second computation may be further based on an output of the first computation) may be required to generate the digital signature of a shard chain. In this example, the first secret may be divided and shared among the computer nodes excluding the required node, and the second secret may be provided to the required node. Furthermore, the shares (which include portions of the secret) are generated and distributed among the remaining computer nodes such that not all of the shares, but at least a required minimum threshold number t of shares, are required to re-generate the shared secret (e.g., the first secret).

Figure 15:
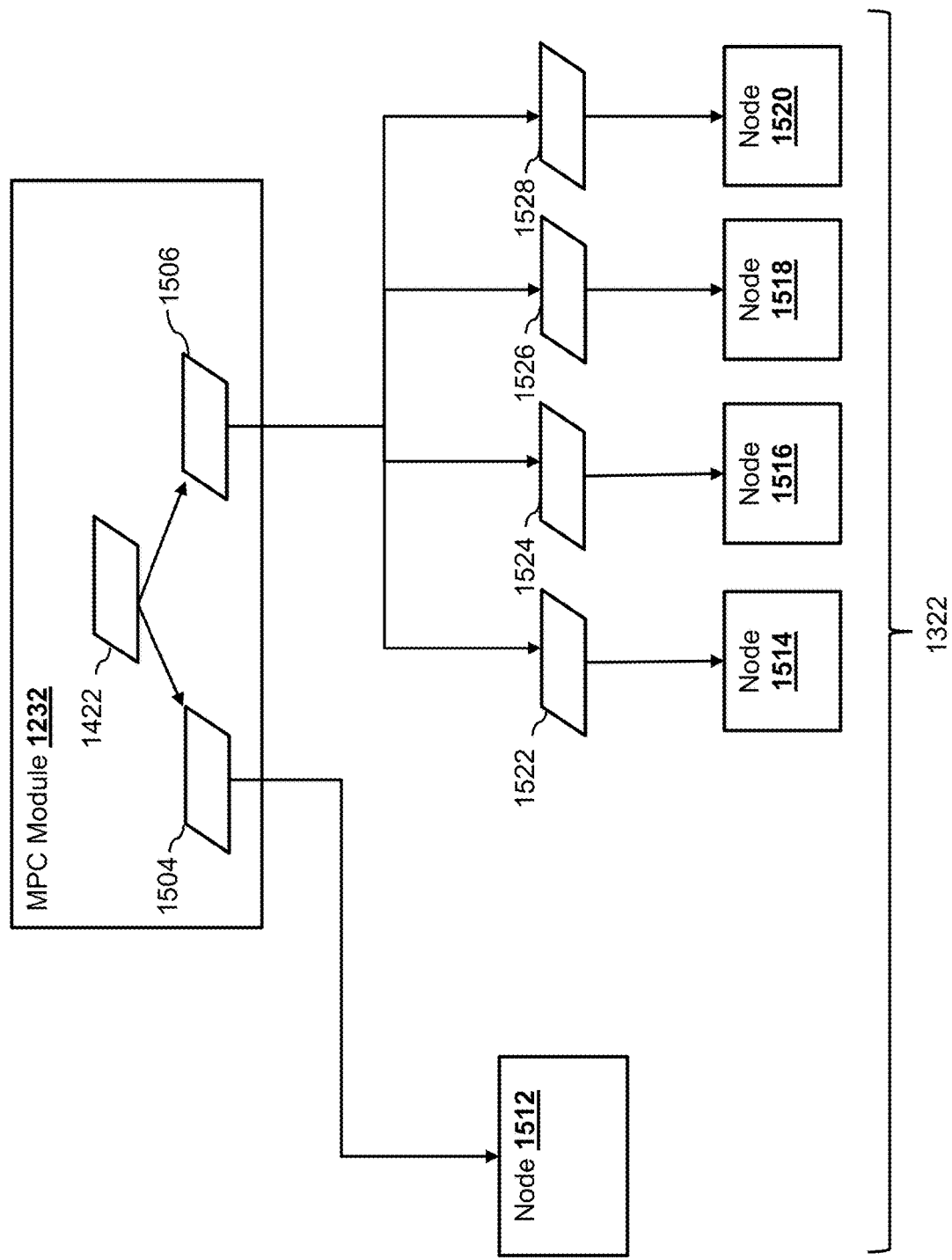
FIG. 15 illustrates distributing of secrets and shares of a secret among a set of computer nodes according to an embodiment of the present disclosure.

FIG. 15 illustrates how secret(s) and shares associated with a secret can be generated and distributed among a shard network of computer nodes associated with a shard chain according to some embodiments of the disclosure. In this example, the configuration module 1408 may determine a multi-party computation scheme for validating transactions conducted through the shard chain 1312 that is managed by the shard network 1322, which includes computer nodes 1512, 1514, 1516, 1518, and 1520. The configuration module 1408 may determine, based on the various metrics associated with the shard chain 1312 and the computer nodes in the shard network 1322, that at least three computer nodes out of the five computer nodes in the shard network of computer nodes 1322 are required to perform the validation process in order to validate transactions to be recorded in the shard chain 1312. Furthermore, in this example, the configuration module 1408 may designate the computer node 1512 as a required (must-have) node for the validation process of the shard chain 1312 such that in addition to having a quorum (e.g., three participating nodes in the validation process), the computer node 1512 must be part of the validation process to validate a transaction to be recorded in the shard chain 1312. In some embodiments, the configuration module 1408 designates the computer node 1512 to be the required node based at least in part on the computer node 1512 being part of the shard network 1322 and also one or more of the other shard networks 1324 and 1326.

As shown in the figure, since one required node is designated for the shard chain 1312 according to the multi-party computation scheme determined for the shard chain 1312, the MPC manager 1402 may generate two secrets 1504 and 1506 based on the private key 1422 associated with the shard chain 1312 (or the shard network 1322). Each of the secrets 1504 and 1506 may include a string, which can be an encryption key or data that can be used by a computer node of the shard network 1322 to perform computations associated with the validation process, which will be explained in more detail below. In some embodiments, the two secrets 1504 and 1506 generated based on the private key 1422 are not reversible, meaning that the private key 1422 cannot be re-generated from the secrets 1504 and 1506. However, the secrets 1504 and 1506 may be used in a set of computations (the validation process), performed by the set of computer nodes in collaboration, to mimic a function of signing (e.g., encrypting) a piece of data using the private key 1422. The set of computations may include a first computation based on the secret 1506 (e.g., performing a first manipulation on a piece of data using the secret 1506 to generate a first output) and a second computation based on the secret 1504 (e.g., performing a second manipulation on the first output based on the secret 1504 to generate a second output). The second output may correspond to a digital signature of the shard network (the second output is identical to encrypting the piece of data using the private key 1422). Once the secrets 1504 and 1506 are generated, the MPC manager 1402 may discard the private key 1422 (e.g., permanently removing the private key 1422).

The MPC manager 1402 may then distribute the secret 1504 to the required node (e.g., the computer node 1512). In response to receiving the secret 1504 from the MPC manager 1402, the computer node 1512 may securely store the secret 1504 on the computer node 1512 (e.g., a persistent data storage such as a hard drive, a flash drive, etc.).

In some embodiments, the MPC manager 1402 may generate shares associated with the secret 1506. Each share may include one or more portions of the secret 1506, or information that may be used with other shares to re-generate the secret 1506. The shares may be distributed among the remaining computer nodes 1514, 1516, 1518, and 1520. For example, the MPC manager 1402 may generate shares 1522, 1524, 1526, and 1528 for the computer nodes 1514, 1516, 1518, and 1520. The MPC manager 1402 may distribute the shares 1522, 1524, 1526, and 1528 to the computer nodes 1514, 1516, 1518, and 1520, respectively. In some embodiments, the MPC manager 1402 generate shares by dividing the secret 1506 into multiple parts, where each share includes one or more parts of the secret 1506. For example, the MPC manager 1402 may generate the shares 1522, 1524, 1526, and 1528, where each share includes multiple parts (but not all parts) of the secret 1506 such that each computer node does not possess the entirety of the secret 1506. Furthermore, different shares may include different sets of multiple parts such that a portion of the computer nodes 1514, 1516, 1518, and 1520 (but not all of the computer nodes) are needed to have all of the parts of the secret 1506. In some embodiments, the shares can be generated based on Shamir's secret sharing techniques, where the secret 1506 may be transformed into a polynomial and each share includes a distinct data point (having a set of coordinates) of the polynomial. In some embodiments where the secret 1506 is transformed into a polynomial, the secret 1504 may be implemented as an offset to the polynomial.

Upon receiving the corresponding shares 1522, 1524, 1526, and 1528, the computer nodes 1514, 1516, 1518, and 1520 may store the corresponding shares 1522, 1524, 1526, and 1528. After distributing the secret 1504 and the shares 1522, 1524, 1526, and 1528 of the secret 1506, the shard network of computer nodes 1322 are ready to perform the validation process to validate transactions according to the multi-party computation scheme. In some embodiments, after distributing the secret 1504 and the shares 1522, 1524, 1526, and 1528, the MPC manager 1402 may also discard (delete or otherwise destroy) copies of the secret 1504 and the shares 1522, 1524, 1526, and 1528 from its memory.

Figure 16:
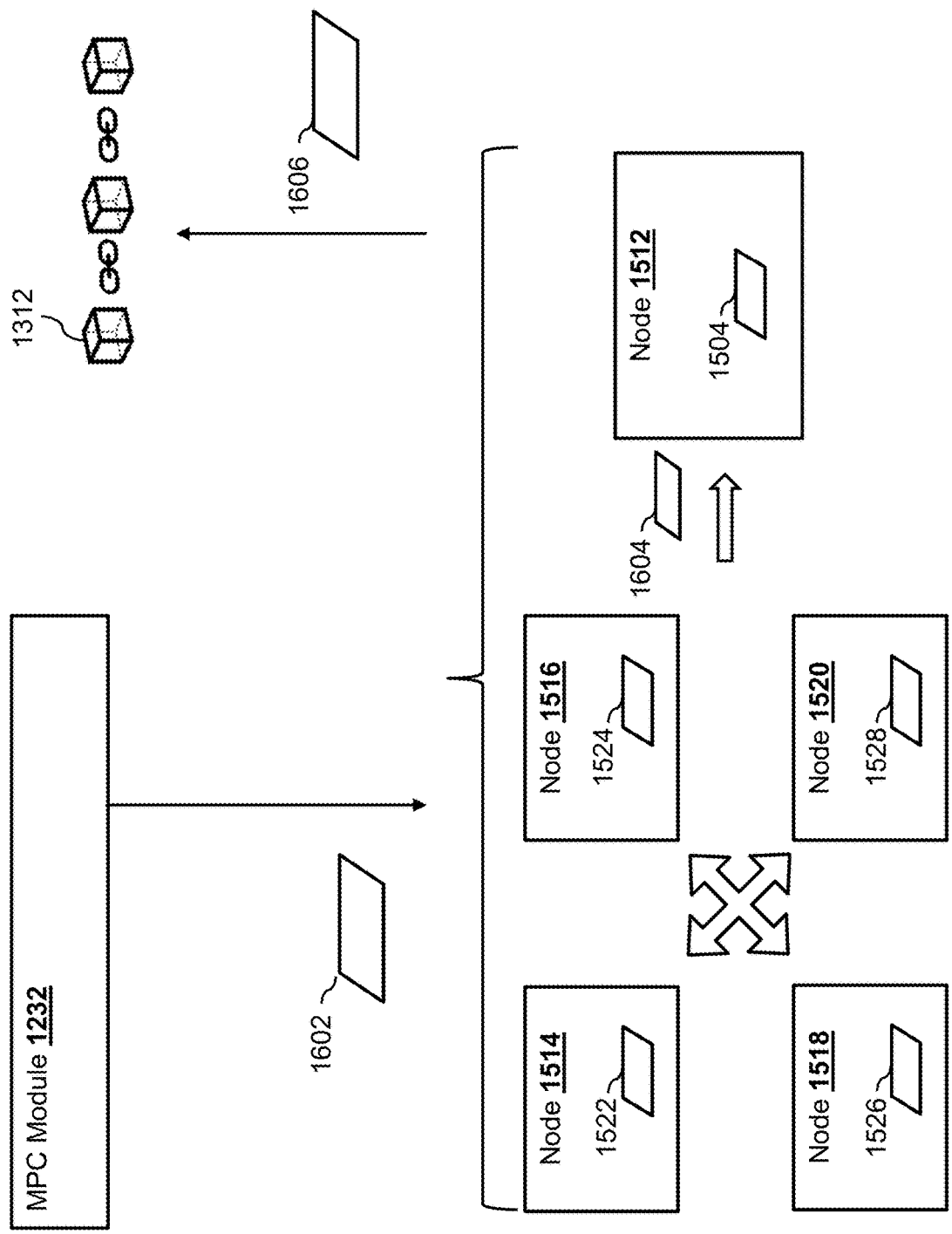
FIG. 16 illustrates interactions among a set of computer nodes for performing validation process according to an embodiment of the present disclosure.

FIG. 16 illustrates an example validation process performed by the shard network of computer nodes 1322 to validate a transaction to be recorded in the shard chain 1312 according to some embodiments of the disclosure. In some embodiments, the user 1240 may use the user device 110 to initiate a transaction with the service provider server 1230. The transaction may be a cryptocurrency transaction (e.g., transferring an amount of cryptocurrency from one wallet to another wallet, etc.), a smart contract transaction, or any type of transactions. In some embodiments, the user 1240 may transmit a transaction request to the service provider server 1230. The transaction request may include credentials (e.g., a user name, a password, etc.) associated with the user account. Upon verifying the credentials, the service provider server 1230 may determine a particular shard chain for recording the transaction. For example, the service provider server 1230 may determine the particular shard chain based on an identity of the user account used to conduct the transaction, a location at which the transaction is conducted, and/or other factors. In this example, the service provider server 1230 may determine that the shard chain 1312 is suitable for recording the transaction. Thus, the service provider server 1230 may transmit transaction data 1602 associated with the transaction to one or more of the computer nodes in the network of computer nodes 1322, including the computer nodes 1512, 1514, 1516, 1518, and 1520. The transaction data 1602 may be directly transmitted by the service provider server 1230 to each of the computer nodes 1512, 1514, 1516, 1518, and 1520. Alternatively, once any one computer node within the shard network 1322 receives the transaction data 1602, the computer node may be configured to automatically broadcast the transaction data 1602 to the other computer nodes in the shard network 1322.

In some embodiments, the validation process includes an ordered sequential set of computations, where the set of computations must be performed in order based on the secrets and/or the portions of the secrets. Thus, the secrets and/or the portions of the secrets distributed to the computer nodes may be labeled (e.g., based on the order). When the computer nodes 1512, 1514, 1516, 1518, and 1520 receives the transaction (or the transaction data associated with the transaction), each of the computer nodes 1512, 1514, 1516, 1518, and 1520 may verify the transaction. For example, each computer node may traverse its copy of the shard chain 1312 to determine whether the transaction is legitimate based on other transactions recorded in the shard chain 1312. When it is determined that the transaction is verified, each computer node may determine if the computer node can perform the initial computation (e.g., an initial validation routine that is part of the validation process) based on a first portion of the secret 1506 stored on the computer node. If the computer node determines that it can perform the initial computation based on the first portion of the secret 1506 in its possession (the first portion is included in the corresponding share stored on the computer node), the computer node may perform the initial computation based on the transaction data and the first portion of the secret 1506 (labeled as the first portion) within its corresponding share. The performing of the initial computation may manipulate the transaction data 1602 based on the first portion of the secret 1506 and generate a first output. The computer node may broadcast the first output to other computer nodes. Each of the computer nodes may determine if it is capable of performing a second computation (e.g., a second validation routine that is part of the validation process) based on a second portion of the secret 1506. If a computer node determines that it can perform the second computation based on the second portion of the secret 1560 in its possession (the second portion included in a corresponding share stored on the computer node), it may perform the second computation. The second computation may involve manipulating the first output using the second portion of the secret 1506. The computer nodes 1514, 1516, 1518, and 1520 may continue to perform computations as part of the validation process using portions of the secret 1506 in their possessions until all of the computations involving the secret 1506 is completed. The last computation may generate the output 1604. When all of the computations involving the secret 1506 is completed, the computer node that performed the last computation may transmit the output 1604 to the required computer node 1512.

Upon receiving the output 1604, the computer node 1512 may perform a computation corresponding to the validation process based on the secret 1504 stored on the computer node 1512. In some embodiments, the computation performed by the computer node 1512 further manipulates the output 1604 based on the secret 1504 to generate an output 1606, which is the final output of the validation process. In some embodiments, the final output 1606 may correspond to a digital signature associated with the shard chain 1312. The computer node 1512 may broadcast the output 1606 to the other computer nodes in the shard network 1312 such that each of the computer nodes in the shard network 1312 may record the transaction along with the output 1606 (e.g., the digital signature of the shard chain 1312) to their copies of the shard chain 1312. Since the digital signature is also included in the shard chain 1312, any device (e.g., any computer node in the shard network 1322 or other computer node) may verify the digital signature by decrypting the output 1606 using a public key associated with the shard chain 1312 and verifying that the decrypted signature corresponds to the transaction data stored in the shard chain 1312. If more than the minimum threshold number of computer nodes (e.g., three) from the shard network 1322, and the required computer node 1512 participated in the validation process, the output 1606 should correspond to the digital signature of the shard chain 1312 (e.g., decrypting the output 1606 using the public key of the shard chain 1312 should produce a value that matches the transaction data 1602). On the other hand, if less than the minimum threshold number of computer nodes (e.g., two) participated in the validation process or the required computer node 1512 failed to participate in the validation process, the output 1606 would not correspond to the digital signature of the shard chain 1312 (e.g., decrypting the output 1606 using the public key of the shard chain 1312 would produce a value that does not match the transaction data 1602).

Each computer node in the shard network 1322 may verify the output 1606 accordingly, and may add the transaction data 1602 and the output 1606 to its copy of the shard chain 1312 (e.g., add the transaction data 1602 and the output 1606 to a block and append the block to the shard chain 1312) only if the output 1606 is verified. If the output 1606 is not verified, the computer node should discard the transaction.

In some embodiments, after the multi-party computation schemes are implemented within the shard networks (e.g., the shard networks 1322, 1324, 1326 etc.), the MPC manager 1402 may continue to monitor the different characteristics of the shard networks (e.g., the shard networks 1322, 1324, 1326, etc.) and the corresponding shard chains (e.g., the shard chains 1312, 1314, 1316, etc.). For example, the shard analysis module 1406 may continue to monitor (e.g., periodically, etc.) the different attributes of the transactions being added to each of the shard chains, the volatility of the new transactions being added to each of the shard chains, the conditions (e.g., security conditions, etc.) of the computer nodes in each of the shard networks, network conditions among the computer nodes in each of the shard networks, and other attributes. Based on the updated characteristics of the shard networks, the configuration module 1408 may determine whether to modify one or more multi-party computation schemes for one or more shard chains.

For example, if it is determined that the amounts associated with the new transactions being added to a shard chain (e.g., transactions that were added after a threshold time) are significantly larger than (e.g., more than a threshold) the amounts associated with the old transactions in the shard chain (e.g., transactions that were added before the threshold time), or that the number of transactions being added to a shard chain within a time duration in a recent time is significantly larger than the number of transactions being added to the shard chain within the same time duration in the past, the configuration module 1408 may determine to increase the minimum threshold number of computer nodes required to participate in the validation transaction, increase the number of required computer nodes for validating transactions, or both, for the shard chain.

In another example, if it is determined that the computer node that is designated as the required computer node in the existing multi-party computation scheme of a shard chain has a security issue (e.g., software not up-to-date, recent attack on the computer node, etc.), the configuration module 1408 may increase the number of required nodes for validating transactions and/or designate another computer node as the required node for the shard chain.

In yet another example, if it is determined that the volatility of new transactions is significantly greater than old transactions in the shard chain, the configuration module 1408 may also increase the minimum threshold number of computer nodes required to participate in the validation transaction, increase the number of required computer nodes for validating transactions, or both, for the shard chain.

In some embodiments, based on the updated characteristics of a shard chain (e.g., the shard chain 1312), the configuration module 1408 may also modify one or more multi-party computation schemes of one or more other shard chains (e.g., the shard chains 1314, 1316, etc.). It is because if the security risk increases for one shard chain, it may affect the security risks of other shard chains as well. For example, if an increase number of attacks has been detected on one shard network (e.g., the shard network 1322), the configuration module 1408 may foresee that similar attack trend may likely occur in other shard networks as well. Thus, the configuration module 1408 may increase the security by modifying the multi-party computation schemes of multiple shard chains (e.g., the shard chains 1312, 1314, and 1316) based on the detected event on one shard chain.

Once the multi-party computation scheme has been modified, the MPC manager 1402 may implement the modified multi-party computation scheme within the shard network. In some embodiments, to implement the modified multi-party computation scheme, the MPC manager 1402 may generate new secrets and new shares of secret, and may distribute the new secrets and the new shares of secrets among the computer nodes within the shard network using the techniques described here.

Figure 17:
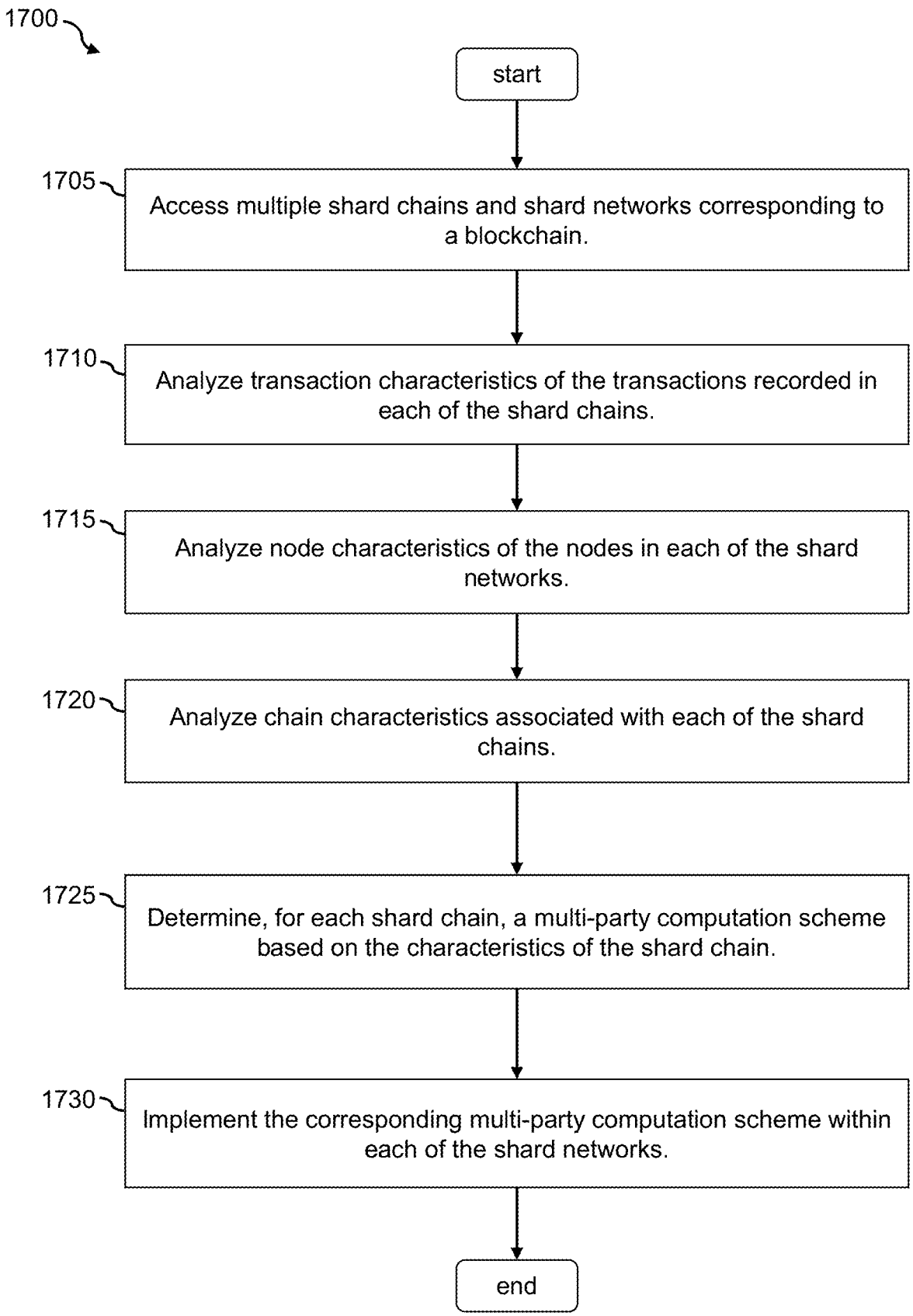
FIG. 17 is a flowchart showing a process of implementing a multi-party computation scheme for a shard chain according to an embodiment of the present disclosure.

FIG. 17 illustrates a process 1700 for determining and implementing a multi-party computation scheme according to various embodiments of the disclosure. In some embodiments, at least a portion of the process 1700 may be performed by the MPC module 1232. It is noted that while in some embodiments, the MPC module 1232 may be implemented as a centralized module for implementing the multi-party computation scheme across multiple shards, in other embodiments, a separate MPC module 1232 may be implemented for implementing a multi-party computation scheme for each shard separately. The process 1700 may begin by accessing (at step 1705) multiple shard chains and shard networks corresponding to a blockchain. For example, the shard analysis module 1406 may access, via the shard interface, the computer nodes within the shard networks 1322, 1324, and 1326. The shard analysis module 1406 may obtain copies of the shard chains stored within the computer nodes. For example, the shard analysis module 1406 may access copies of the shard chain 1312 from computer nodes in the shard network 1322. Similarly, the shard analysis module 1406 may access copies of the shard chain 1314 from computer nodes in the shard network 1324, and access copies of the shard chain 1316 from computer nodes in the shard network 1326.

The process 1700 then analyzes (at step 1710) transaction characteristics of the transactions recorded in each of the shard chains. For example, the shard analysis module 1406 may analyze the transactions recorded in the shard chains 1312, 1314, and 1316. In some embodiments, the shard analysis module 1406 may determine the amounts associated with the transactions recorded in a shard chain, an average amount of the transactions, a volatility of the transactions, a total number of transactions, and other transaction attributes.

The process 1700 then analyzes (at step 1715) node characteristics of the nodes in each of the shard chains. For example, the shard analysis module 1406 may analyze the computer nodes within each of the shard networks 1322, 1324, and 1326. The shard analysis module 1406 may determine hardware and/or software configurations of each computer node (e.g., whether any security hardware or software has been installed on the computer node, etc.), network attributes of each computer node, and other computer attributes for each computer node in the shard networks.

The process 1700 then analyzes (at step 1720) chain characteristics associated with each of the shard chains. For example, the shard analysis module 1406 may analyze the copies of the shard chains stored in the computer nodes of the shard networks. The shard analysis module 1406 may determine a size of the shard chain, an age of the blocks in the shard chains, a rate or frequency of blocks being added to the shard chain, and also characteristics of the blockchain of which the shard chain is a part.

The process 1700 determines (at step 1725), for each shard chain, a multi-party computation scheme based on the characteristics of the shard chain. For example, the configuration module 1408 may determine a multi-party computation scheme for each of the shard chains 1312, 1314, and 1316. Each multi-party computation scheme may specify a minimum threshold number of participating computer nodes and one or more required computer nodes for validating transactions to be recorded in the corresponding shard chain.

The process 1700 then implements (at step 1730) the corresponding multi-party computation scheme within each of the shard networks. For example, the MPC manager 1402 may interact with the computer nodes in each of the shard networks 1322, 1324, and 1326 to configure the computer nodes according to the corresponding multi-party computation scheme. In some embodiments, the MPC manager 1402 may generate secrets and shares of the secrets based on a private key of each shard chain, and may distribute the secrets and shares of the secrets among the computer nodes in the shard networks. Once the multi-party computation schemes are implemented, the shard networks 1322, 1324, and 1326 may begin validating transactions under the corresponding multi-party computation scheme.

Figure 18:
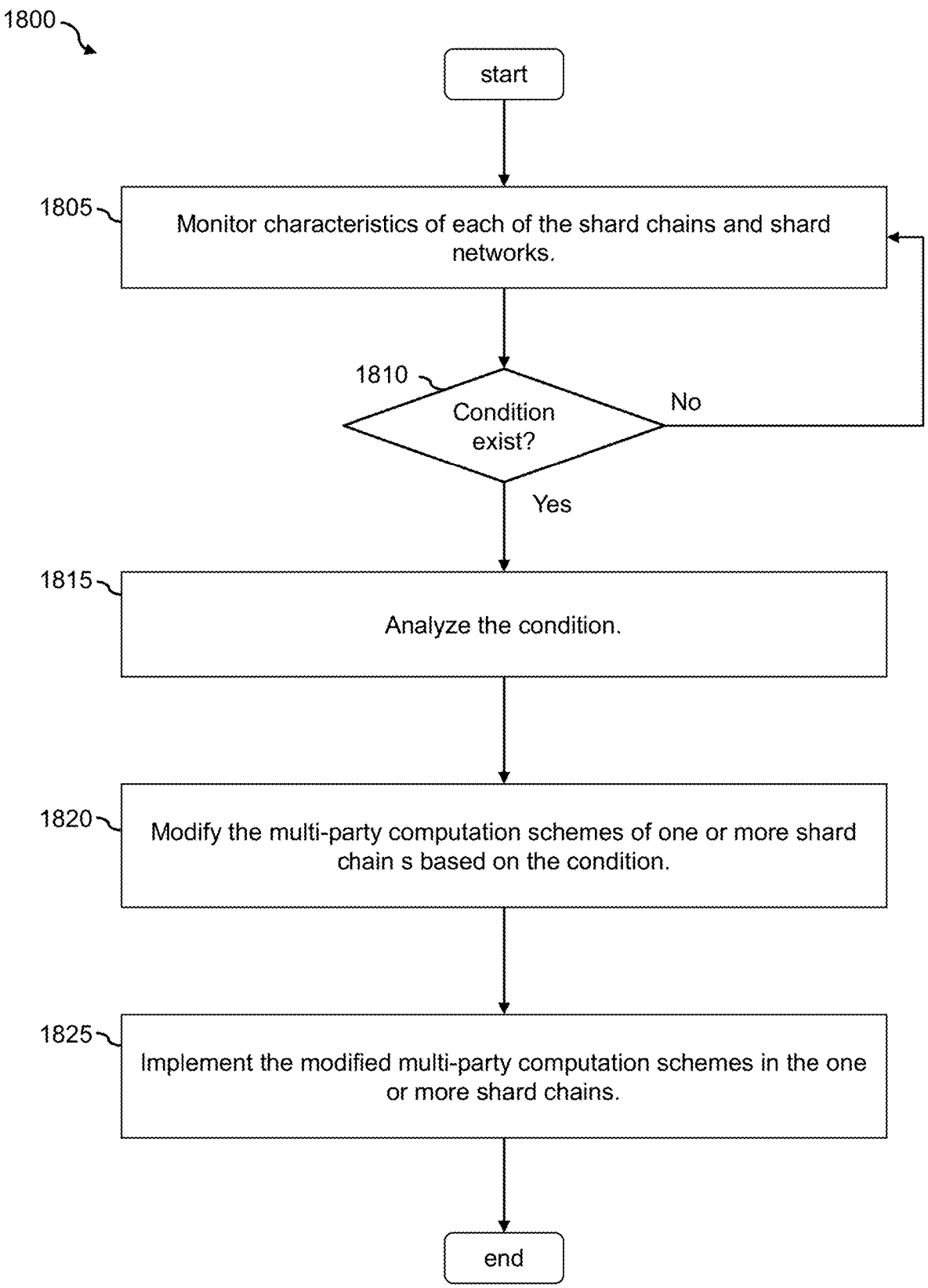
FIG. 18 is a flowchart showing a process of modifying a multi-party computation scheme for a shard chain according to an embodiment of the present disclosure.

FIG. 18 illustrates a process 1800 for modifying a multi-party computation schemes according to various embodiments of the disclosure. In some embodiments, at least a portion of the process 1800 may be performed by the MPC module 1232. The process 1800 may begin by monitoring (at step 1805) characteristics of each of the shard chains and shard networks. For example, the shard analysis module 1406 may monitor the transaction characteristics of transactions being added to the shard chains 1312, 1314, and 1316, the node characteristics of the computer nodes in each of the shard networks 1322, 1324, and 1326, and the chain characteristics of the shard chains 1312, 1314, and 1316.

The process 1800 then determines (at step 1810) whether a condition exist. For example, the MPC manager 1402 may determine whether there is a change in the transaction characteristics, the node characteristics, and the chain characteristics. The MPC manager 1402 may determine a condition exists when the change is larger than a threshold. If the condition does not exist, the process 1800 reverts back to the step 1805 and continues to monitor the characteristics of each of the shard chains and shard networks. However, if such a condition exists, the process 1800 analyzes (at step 1815) the condition and modifies (at step 1820) the multi-party computation schemes of one or more shard chains based on the condition. For example, the configuration module 1408 may analyze the characteristics (and change of the characteristics) of a shard chain, and may determine a modified multi-party computation scheme for a shard chain. The modification may include adjusting (e.g., increasing or decreasing) the minimum threshold number of required computer nodes in participating the validation process, changing the number of required computer nodes for participating the validation process, and/or assigning a different required computer node for participating the validation process. In some embodiments, based on a detected condition in a shard chain, the MPC module 1232 may modify only the multi-party computation scheme for that shard chain. In some embodiments, the MPC module 1232 may modify the multi-party computation scheme(s) for one or more other shard chains also based on the detected condition of the shard chain.

The process 1800 then implements (at step 1825) the modified multi-party computation schemes in the one or more shard chains. In some embodiments, to implement the modified the multi-party computation schemes, the MPC manager 1402 may generate new secrets and new shares of secrets and distribute the new secrets and new shares of secrets to the computer nodes in the shard networks.

Figure 19:
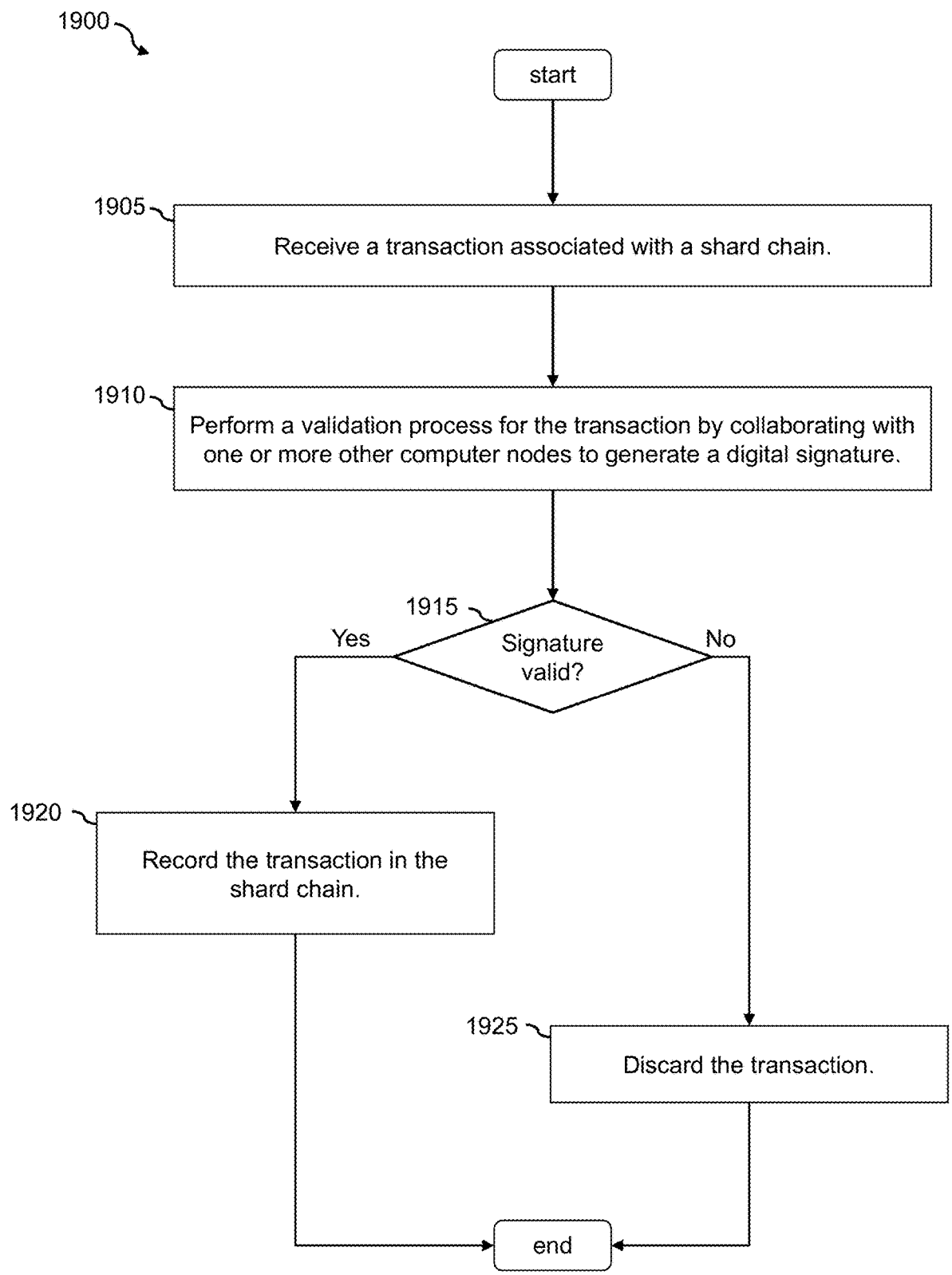
FIG. 19 is a flowchart showing a process of performing a validation process according to an embodiment of the present disclosure.

FIG. 19 illustrates a process 1900 for performing a validation process according to various embodiments of the disclosure. In some embodiments, at least a portion of the process 1900 may be performed by the computer nodes associated with a shard network. The process 1900 may begin by receiving (at step 1905) a transaction associated with a shard chain. For example, when the service provider server 1230 receives a transaction request, the service provider server 1230 may generate transaction data associated with the transaction request, and may transmit the transaction data to computer nodes associated with a shard chain. Upon receiving the transaction data, a computer node associated with the shard chain may broadcast the transaction data to other computer nodes in the shard network associated with the shard chain such that every computer node in the shard network receives the transaction data.

The process 1900 then performs (at step 1910) a validation process for the transaction by collaborating with one or more other computer nodes to generate a digital signature. For example, the computer nodes in the shard network may collaborate with each other to perform a series of computations using the shares of secrets in their possessions. If the computer nodes that participate in the validation process using their shares of secrets satisfy the criteria specified in the multi-party computation scheme (e.g., computer nodes that satisfy the minimum threshold number requirement, and including the required computer node(s)), a correct digital signature based on the transaction data would be produced. On the other hand, if the computer nodes that participate in the validation process do not satisfy the criteria specified in the multi-party computation scheme, an incorrect digital signature (or no digital signature) would be produced.

Next, the process 1900 determines (at step 1915) whether the signature is valid, and records (at step 1920) the transaction in the shard chain if the signature is valid. On the other hand, if the signature is not valid, the process 1900 discards (at step 1925) the transaction. For example, each computer node in the shard network may determine whether the output signature from the validation process is a valid signature. The computer node can verify the signature by decrypting the signature using a public key associated with the shard chain, and determining whether the decrypted signature corresponds to the transaction data. If the signature is valid, the computer node may add the transaction to a block and append the block to the shard chain. On the other hand, if the signature is invalid, the computer node may discard the transaction.

FIG. 20 is a block diagram of a computer system 2000 suitable for implementing one or more embodiments of the present disclosure, including the service provider server 1230, the merchant server 1220, the user device 1210, and the computer nodes 1512, 1514, 1516, 1518, and 1520. In various implementations, the user device 1210, and other user devices may include a mobile cellular phone, personal computer (PC), laptop, wearable computing device, etc. adapted for wireless communication, and each of the service provider server 1230, the merchant server 1220, and the computer nodes 1512, 1514, 1516, 1518, and 1520 may include a network computing device, such as a server. Thus, it should be appreciated that the devices/servers 1210, 1220, 1230, 1512, 1514, 1516, 1518, and 1520 may be implemented as the computer system 2000 in a manner as follows.

The computer system 2000 includes a bus 2012 or other communication mechanism for communicating information data, signals, and information between various components of the computer system 2000. The components include an input/output (I/O) component 2004 that processes a user (i.e., sender, recipient, service provider) action, such as selecting keys from a keypad/keyboard, selecting one or more buttons or links, etc., and sends a corresponding signal to the bus 2012. The I/O component 2004 may also include an output component, such as a display 2002 and a cursor control 2008 (such as a keyboard, keypad, mouse, etc.). The display 2002 may be configured to present a login page for logging into a user account or a checkout page for purchasing an item from a merchant. An optional audio input/output component 2006 may also be included to allow a user to use voice for inputting information by converting audio signals. The audio I/O component 2006 may allow the user to hear audio. A transceiver or network interface 2020 transmits and receives signals between the computer system 2000 and other devices, such as another user device, a merchant server, or a service provider server via a network 2022, such as network 1260 of FIG. 12. In one embodiment, the transmission is wireless, although other transmission mediums and methods may also be suitable. A processor 2014, which can be a micro-controller, digital signal processor (DSP), or other processing component, processes these various signals, such as for display on the computer system 2000 or transmission to other devices via a communication link 2024. The processor 2014 may also control transmission of information, such as cookies or IP addresses, to other devices.

The components of the computer system 2000 also include a system memory component 2010 (e.g., RAM), a static storage component 2016 (e.g., ROM), and/or a disk drive 2018 (e.g., a solid-state drive, a hard drive). The computer system 2000 performs specific operations by the processor 2014 and other components by executing one or more sequences of instructions contained in the system memory component 2010. For example, the processor 2014 can perform the transaction validation functionalities described herein according to the processes 1700, 1800, and 1900.

Logic may be encoded in a computer readable medium, which may refer to any medium that participates in providing instructions to the processor 2014 for execution. Such a medium may take many forms, including but not limited to, non-volatile media, volatile media, and transmission media. In various implementations, non-volatile media includes optical or magnetic disks, volatile media includes dynamic memory, such as the system memory component 2010, and transmission media includes coaxial cables, copper wire, and fiber optics, including wires that comprise the bus 2012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 2000. In various other embodiments of the present disclosure, a plurality of computer systems 2000 coupled by the communication link 2024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
obtaining attributes associated with a first shard chain in a plurality of shard chains that corresponds to a blockchain, wherein the attributes are obtained from a plurality of computer nodes configured to manage the first shard chain;
analyzing the attributes;
determining, based on the analyzing, a multi-party computation scheme for validating transactions conducted through the first shard chain, wherein the multi-party computation scheme specifies (i) a minimum threshold number of computer nodes from the first plurality of computer nodes required to collaborate in validating the transactions to be recorded in the first shard chain and (ii) a first computer node, from the first plurality of computer nodes, as a required node required to collaborate in the validating the transactions to be recorded in the first shard chain; and
configuring the first plurality of computer nodes to perform a transaction validation process according to the multi-party computation scheme.

2. The system of claim 1, wherein the operations further comprise:
generating a first secret and a second secret based on a cryptographic key associated with the first shard chain, wherein a computational transformation of electronic data using the first secret and the second secret mimics an electronic signing of the electronic data using the cryptographic key;
generating a plurality of shares based on the second secret, wherein the plurality of shares comprises a first number of shares, wherein a second number, that is smaller than the first number, of shares from the plurality of shares is required to recover the second secret, and wherein the second number corresponds to the minimum threshold number of computer nodes specified in the multi-party computation scheme; and
distributing the first secret to the first computer node and the plurality of shares to the first plurality of computer nodes excluding the first computer node.

3. The system of claim 1, wherein the analyzing comprises analyzing transactions recorded in the first shard chain.

4. The system of claim 1, wherein the analyzing comprises analyzing a volatility of transactions recorded in the first shard chain.

5. The system of claim 1, wherein the analyzing comprises analyzing computer hardware and software configurations of the first plurality of nodes.

6. The system of claim 1, wherein the multi-party computation scheme is a first multi-party computation scheme, and wherein the operations further comprise:
subsequent to the configuring the first plurality of computer nodes according to the first multi-party computation scheme, detecting a condition associated with at least one of the first plurality of computer nodes or the first shard chain;
in response to the detecting the condition, determining a second multi-party computation scheme for the first shard chain; and
re-configuring the first plurality of computer nodes to perform the transaction validation process according to the second multi-party computation scheme.

7. The system of claim 6, wherein the second multi-party computation scheme specifies a second minimum threshold number of computer nodes to collaborate in the validating the transactions to be recorded in the first shard chain.

8. The system of claim 6, wherein the second multi-party computation scheme specifies a second computer node, from the first plurality of computer nodes, as the required node required to collaborate in the validating the transactions to be recorded in the first shard.

9. A method comprising:
interacting by one or more hardware processors, with a plurality of computer nodes configured to manage a first shard chain in a plurality of shard chains that corresponds to a blockchain;
determining, based on the interacting and by the one or more hardware processors, characteristics related to the first shard chain;
determining, by the one or more hardware processors, a multi-party computation scheme for validating transactions conducted through the first shard chain based on analyzing the characteristics, wherein the multi-party computation scheme specifies (i) a minimum threshold number of computer nodes from the first plurality of computer nodes required to collaborate in validating the transactions to be recorded in the first shard chain and (ii) a first computer node, from the first plurality of computer nodes, as a required node required to collaborate in the validating the transactions to be recorded in the first shard chain; and
configuring, by the one or more hardware processors, the first plurality of computer nodes to perform a transaction validation process according to the multi-party computation scheme.

10. The method of claim 9, wherein the multi-party computation scheme is a first multi-party computation scheme, and wherein the method further comprises:
subsequent to the configuring the first plurality of computer nodes according to the first multi-party computation scheme, detecting a condition associated with at least one of the first plurality of computer nodes or the first shard chain;
in response to the detecting the condition, determining a second multi-party computation scheme for the first shard chain; and
re-configuring the first plurality of computer nodes to perform the transaction validation process according to the second multi-party computation scheme.

11. The method of claim 10, wherein the condition is associated with a change of volatility of transactions associated with the first shard chain.

12. The method of claim 10, wherein the condition is associated with a change of transaction amounts associated with transactions associated with the first shard chain.

13. The method of claim 10, wherein the condition is associated with a change of security-related computer configurations in the first plurality of computer nodes.

14. The method of claim 10, further comprising:
configuring a second plurality of computer nodes associated with a second shard chain from the plurality of shard chains to perform the transaction validation process according to a third multi-party computation scheme;

in response to the detecting the condition associated with at least one of the first plurality of computer nodes or the first shard chain, determining a fourth multi-party computation scheme for the second shard chain; and re-configuring the second plurality of computer nodes to perform the transaction validation process according to the fourth multi-party computation scheme.

15. The method of claim 9, wherein the blockchain is associated with a ledger for recording cryptocurrency transactions of a particular cryptocurrency type.

16. The method of claim 9, wherein the blockchain is associated with a ledger for recording smart contract transactions.

17. A non-transitory machine-readable medium having stored thereon machine-readable instructions executable to cause a machine to perform operations comprising:

obtaining attributes associated with a first shard chain in a plurality of shard chains that corresponds to a blockchain, wherein the attributes are obtained from a plurality of computer nodes configured to manage the first shard chain;

determining a multi-party computation scheme for validating transactions conducted through the first shard chain based on analyzing the attributes, wherein the multi-party computation scheme specifies (i) a minimum threshold number of computer nodes from the first plurality of computer nodes required to collaborate in validating the transactions to be recorded in the first shard chain and (ii) a first computer node, from the first plurality of computer nodes, as a required node required to collaborate in the validating the transactions to be recorded in the first shard chain; and configuring the first plurality of computer nodes to perform a transaction validation process according to the multi-party computation scheme.

18. The non-transitory machine-readable medium of claim 17, wherein the operations further comprise:

generating a first secret and a second secret based on a cryptographic key associated with the first shard chain, wherein a computational transformation of electronic data using the first secret and the second secret mimics an electronic signing of the electronic data using the cryptographic key;

generating a plurality of shares based on the second secret, wherein the plurality of shares comprises a first number of shares, wherein a second number, that is smaller than the first number, of shares from the plurality of shares is required to recover the second secret, and wherein the second number corresponds to the minimum threshold number of computer nodes specified in the multi-party computation scheme; and distributing the first secret to the first computer node and the plurality of shares to the first plurality of computer nodes excluding the first computer node.

19. The non-transitory machine-readable medium of claim 17, wherein the multi-party computation scheme is a first multi-party computation scheme, and wherein the operations further comprise:

subsequent to configuring the first plurality of computer nodes according to the first multi-party computation scheme, detecting a condition associated with a second shard chain in the plurality of shard chain that corresponds to the blockchain;

in response to the detecting the condition, determining a second multi-party computation scheme for the first shard chain; and re-configuring the first plurality of computer nodes to perform transaction validations according to the second multi-party computation scheme.

20. The non-transitory machine-readable medium of claim 19, wherein the condition is associated with a computer attack on at least one computer node configured to manage the second shard chain.

\* \* \* \* \*